United States Patent
Chen et al.

(10) Patent No.: US 8,582,516 B2
(45) Date of Patent: Nov. 12, 2013

(54) REFERENCE SIGNALING FOR A HIGH-MOBILITY WIRELESS COMMUNICATION DEVICE

(75) Inventors: Wanshi Chen, San Diego, CA (US); Tao Luo, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 12/941,704

(22) Filed: Nov. 8, 2010

(65) Prior Publication Data

US 2011/0111781 A1 May 12, 2011

Related U.S. Application Data

(60) Provisional application No. 61/259,561, filed on Nov. 9, 2009.

(51) Int. Cl.
 *H04W 4/00* (2009.01)
 *H04B 7/00* (2006.01)

(52) U.S. Cl.
 USPC .......................................... 370/329; 455/507

(58) Field of Classification Search
 USPC ................... 370/328, 329; 455/507
 See application file for complete search history.

(56) References Cited

U.S. PATENT DOCUMENTS

2009/0225721 A1 * 9/2009 Cudak et al. .................. 370/330

FOREIGN PATENT DOCUMENTS

WO WO2005043791 A2 5/2005
WO WO 2010081553 * 7/2010

OTHER PUBLICATIONS

International Search Report and Written Opinion—PCT/US2010/056008, International Search Authority—European Patent Office—Mar. 11, 2011.

NTT Docomo et al., "Investigation on Pilot Channel Structure for Single-Carrier FDMA Radio Access in Evolved UTRA Uplink", 3GPP Draft, R1-050703 Pilot Structure of Single-Carrier FDMA in Uplink, 3rd Generation Partnership Project (3GPP), Mobile Competence Centre , 650, Route Des Lucioles , F-06921 Sophia-Antipolis Cedex , France, vol. RAN WGI, no. London, UK, Aug. 25, 2005, XP050100353.

NTT Docomo et al., "Physical Channels and Multiplexing in Evolved UTRA Uplink", 3GPP Draft, R1-050850 Uplink Physical Channel Multiplexing, 3rd Generation Partnership Project (3GPP), Mobile Competence Centre , 650, Route Des Lucioles , F-06921 Sophia-Antipolis Cedex , France, vol. RAN WGI, no. London, UK, Aug. 25, 2005, XP050100479.

* cited by examiner

*Primary Examiner* — Ronald Abelson
(74) *Attorney, Agent, or Firm* — Kenyon S. Jenckes

(57) ABSTRACT

A base station for enabling communication with a high-mobility wireless communication device is described. The base station includes a processor and instructions stored in memory. The base station identifies a high-mobility wireless communication device and sends a reference signal configuration. The base station also allocates an additional specific reference signal and sends the additional specific reference signal to the high-mobility wireless communication device.

76 Claims, 12 Drawing Sheets

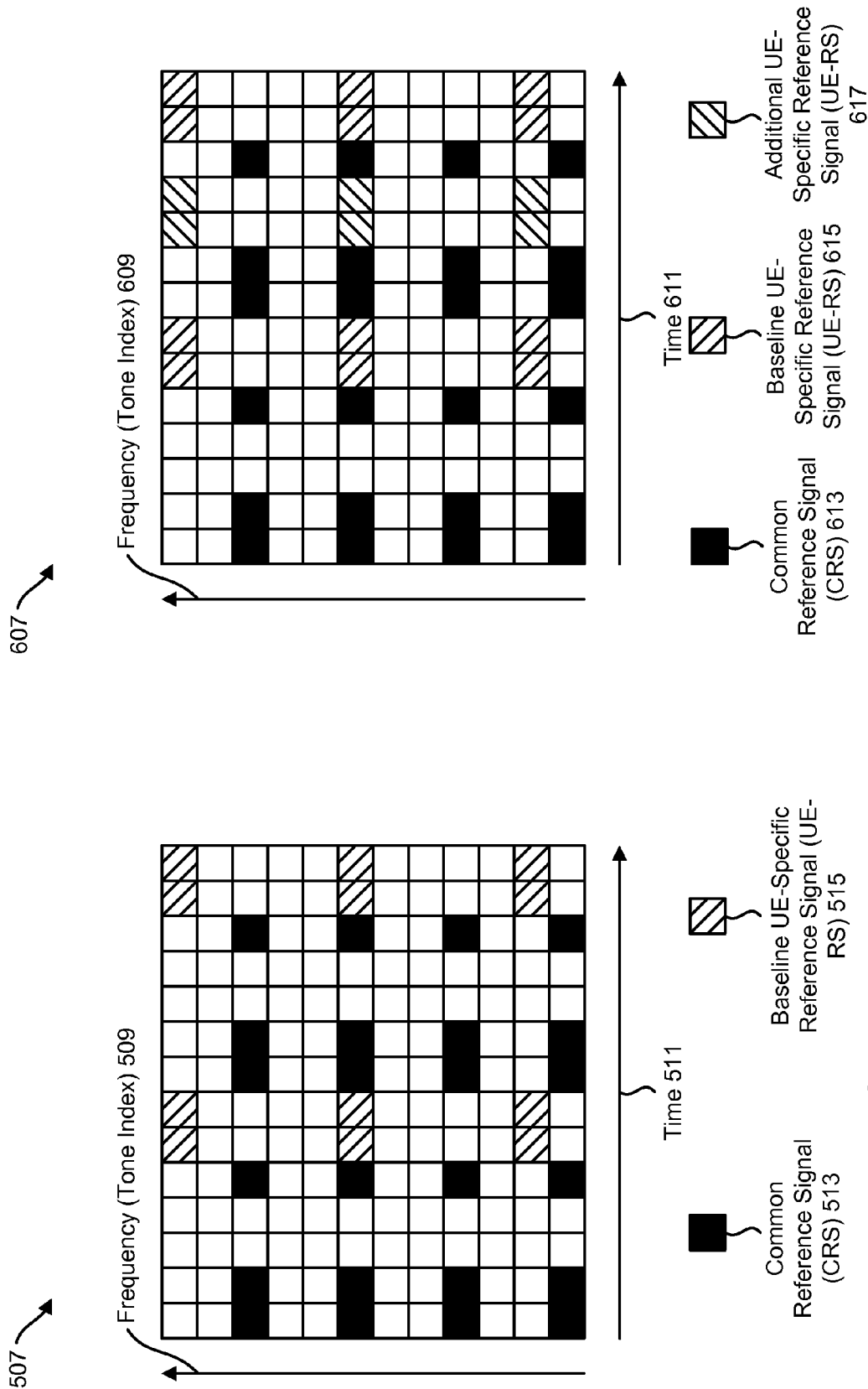

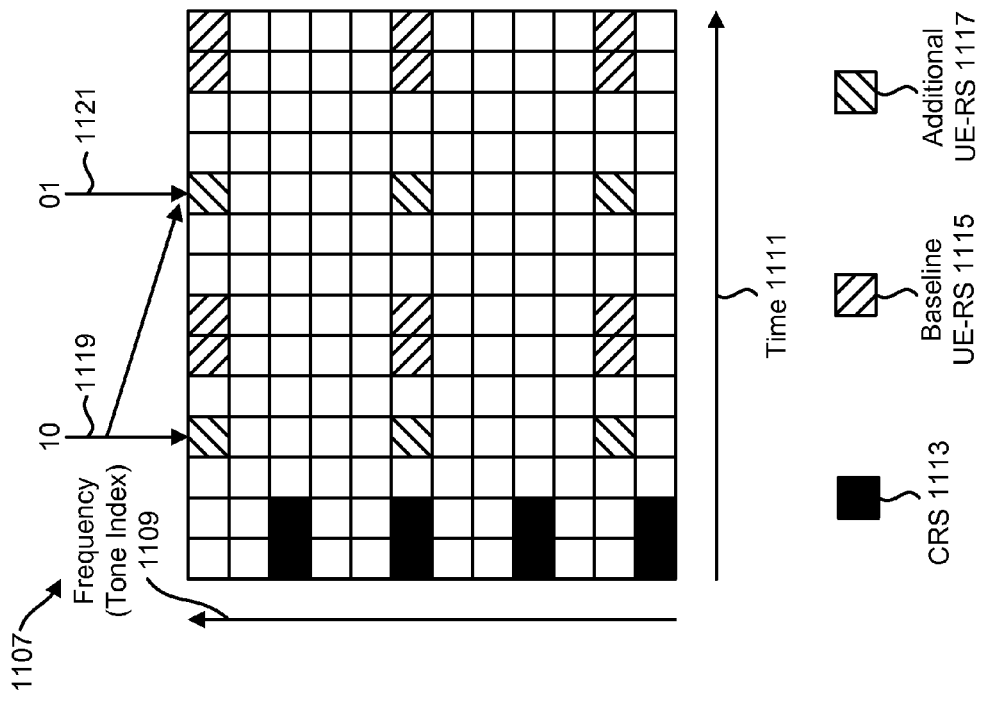
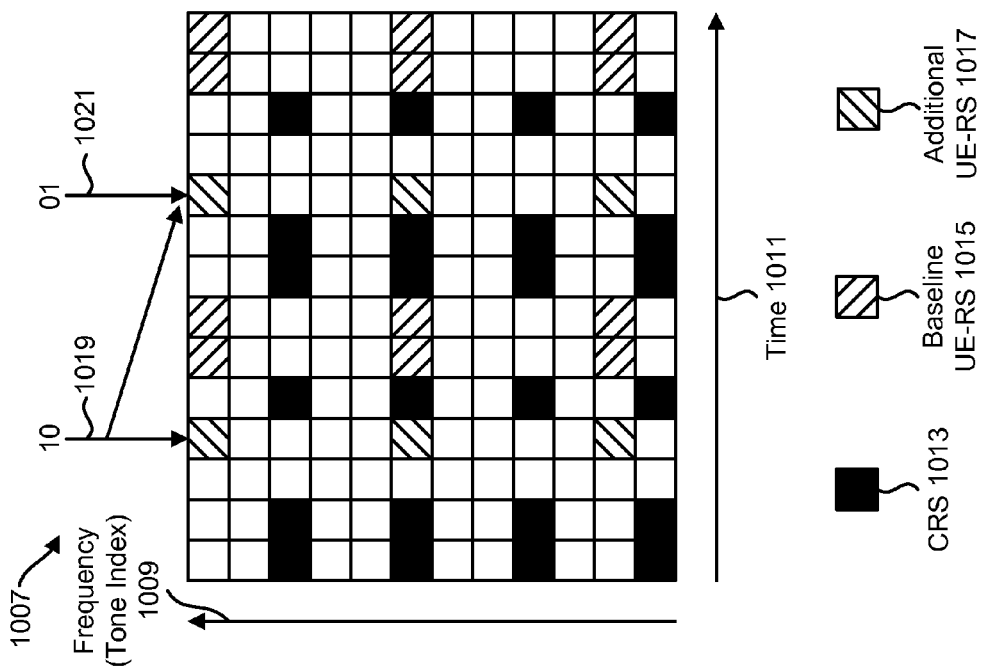

US 8,582,516 B2

REFERENCE SIGNALING FOR A HIGH-MOBILITY WIRELESS COMMUNICATION DEVICE

RELATED APPLICATIONS

This application is related to and claims priority from U.S. Provisional Patent Application Ser. No. 61/259,561 filed Nov. 9, 2009, for "ENHANCED UE-RS DESIGN FOR HIGH MOBILITY UEs IN LTE-A."

TECHNICAL FIELD

The present disclosure relates generally to electronic communications. More specifically, the present disclosure relates to reference signaling for a high-mobility wireless communication device.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices. For example, a wireless communication device (e.g., cellular phone, smartphone, etc.) may wirelessly communicate with a base station and vice-versa. This may enable the wireless communication device to access and/or communicate voice, video, data and so on.

Some wireless communication devices use feedback to improve communication quality. For example, a cellular phone may send feedback based on a received reference signal to a base station, indicating measurements that the base station may use to improve link quality. However, wireless communication devices may be moving at a high speed relative to the base station in some situations. In these situations, typical reference signaling may not be enough to maintain link quality. As can be observed from this discussion, systems and methods that improve reference signaling may be beneficial.

SUMMARY

A base station for enabling communication with a high-mobility wireless communication device is disclosed. The base station includes a processor and instructions stored in memory. The base station identifies a high-mobility wireless communication device. The base station also sends a reference signal configuration. Furthermore, the base station allocates an additional specific reference signal. The base station further sends the additional specific reference signal to the high-mobility wireless communication device. The base station may be a Node B. The specific reference signal may be a User Equipment-specific Reference Signal (UE-RS). The additional specific reference signal may be in addition to a baseline specific reference signal.

Allocating an additional specific reference signal may include using a baseline specific reference signal. Allocating the additional specific reference signal may also include adding an additional specific reference signal in an element not including the baseline specific reference signal. Allocating an additional specific reference signal may include adding the additional specific reference signal in an element used for a common reference signal. Allocating an additional specific reference signal may include adding the additional specific reference signal in an element used for a baseline specific reference signal.

Allocating an additional specific reference signal may include applying a same precoding to the additional specific reference signal as is used for a baseline specific reference signal. Allocating an additional specific reference signal may include applying a same scrambling sequence as in a baseline specific reference signal case. Allocating an additional specific reference signal may include applying a different scrambling sequence as in a baseline specific reference signal case. Allocating an additional specific reference signal may include applying a same mapping mechanism as in a baseline specific reference signal case.

Allocating an additional specific reference signal may include applying a different mapping mechanism from a baseline specific reference signal case. Allocating an additional specific reference signal may include applying transmission rate matching around the additional specific reference signal. Allocating an additional specific reference signal may include applying puncturing.

Sending a reference signal configuration may include sending the reference signal configuration using a layer-3 limited rank transmission. The layer-3 limited rank transmission may be separately configured or uses a codebook subset restriction mechanism. Sending a reference signal configuration may include sending the reference signal configuration using explicit layer-3 signaling. Sending a reference signal configuration may include sending the reference signal configuration using explicit Physical Downlink Control Channel (PDCCH) signaling. Sending a reference signal configuration may include sending the reference signal configuration using implicit Physical Downlink Control Channel (PDCCH) signaling. The reference signal configuration may distinguish between Multimedia Broadcast over a Single-Frequency Network (MBSFN) subframes and non-MBSFN subframes.

A wireless communication device for utilizing reference signaling is also disclosed. The wireless communication device includes a processor and instructions stored in memory. The wireless communication device receives a reference signal configuration. The wireless communication device also receives an additional specific reference signal. Furthermore, the wireless communication device processes the additional specific reference signal. The wireless communication device also sends information based on the additional specific reference signal. Processing the additional specific reference signal may include generating feedback based on the additional specific reference signal. The wireless communication device may be a User Equipment (UE). The specific reference signal may be a User Equipment-specific Reference Signal (UE-RS). The additional specific reference signal may be in addition to a baseline specific reference signal.

The wireless communication device may also determine whether the wireless communication device is a high-mobility wireless communication device. The wireless communication device may also send a high-mobility indicator if the wireless communication device is a high-mobility wireless communication device.

Receiving a reference signal configuration may include receiving the reference signal configuration using a layer-3 limited rank transmission. The layer-3 limited rank transmission may be separately configured or may use a codebook subset restriction mechanism. Receiving a reference signal configuration may include receiving the reference signal configuration using explicit layer-3 signaling. Receiving a reference signal configuration may include receiving the reference signal configuration using explicit Physical Downlink Control Channel (PDCCH) signaling. Receiving a reference signal configuration may include receiving the reference signal configuration using implicit Physical Downlink Control Channel (PDCCH) signaling. The reference signal configuration may distinguish between Multimedia Broadcast over a Single-Frequency Network (MBSFN) subframes and non-MBSFN subframes.

A method for enabling communication with a high-mobility wireless communication device is also disclosed. The method includes identifying, by a base station, a high-mobility wireless communication device. The method also includes sending a reference signal configuration. The method further includes allocating, by the base station, an additional specific reference signal. The method also includes sending, from the base station, the additional specific reference signal to the high-mobility wireless communication device.

A method for utilizing reference signaling is also disclosed. The method includes receiving a reference signal configuration. The method also includes receiving, on a wireless communication device, an additional specific reference signal. The method further includes processing, on the wireless communication device, the additional specific reference signal. The method also includes sending information based on the additional specific reference signal.

A computer-program product for enabling communication with a high-mobility wireless communication device is also disclosed. The computer-program product includes a non-transitory tangible computer-readable medium with instructions. The instructions include code for causing a base station to identify a high-mobility wireless communication device. The instructions also include code for causing the base station to send a reference signal configuration. The instructions further include code for causing the base station to allocate an additional specific reference signal. Furthermore, the instructions include code for causing the base station to send the additional specific reference signal to the high-mobility wireless communication device.

A computer-program product for utilizing reference signaling is also disclosed. The computer-program product includes a non-transitory tangible computer-readable medium with instructions. The instructions include code for causing a wireless communication device to receive a reference signal configuration. The instructions also include code for causing the wireless communication device to receive an additional specific reference signal. The instructions further include code for causing the wireless communication device to process the additional specific reference signal. Furthermore, the instructions include code for causing the wireless communication device to send information based on the additional specific reference signal.

An apparatus for enabling communication with a high-mobility wireless communication device is also disclosed. The apparatus includes means for identifying a high-mobility wireless communication device. The apparatus further includes means for sending a reference signal configuration. The apparatus also includes means for allocating an additional specific reference signal. Furthermore, the apparatus includes means for sending the additional specific reference signal to the high-mobility wireless communication device.

An apparatus for utilizing reference signaling is also disclosed. The apparatus includes means for receiving a reference signal configuration. The apparatus further includes means for receiving an additional specific reference signal. The apparatus also includes means for processing the additional specific reference signal. Furthermore, the apparatus includes means for sending information based on the additional specific reference signal.

BRIEF DESCRIPTION OF THE DRAWINGS

FIG. 5 is a diagram illustrating one example of a subframe without additional specific reference signals;

FIG. 6 is a diagram illustrating a subframe with additional specific reference signals;

FIG. 10 is a diagram illustrating another example of a subframe;

FIG. 11 is a diagram illustrating another example of a subframe;

DETAILED DESCRIPTION

Figure 1:
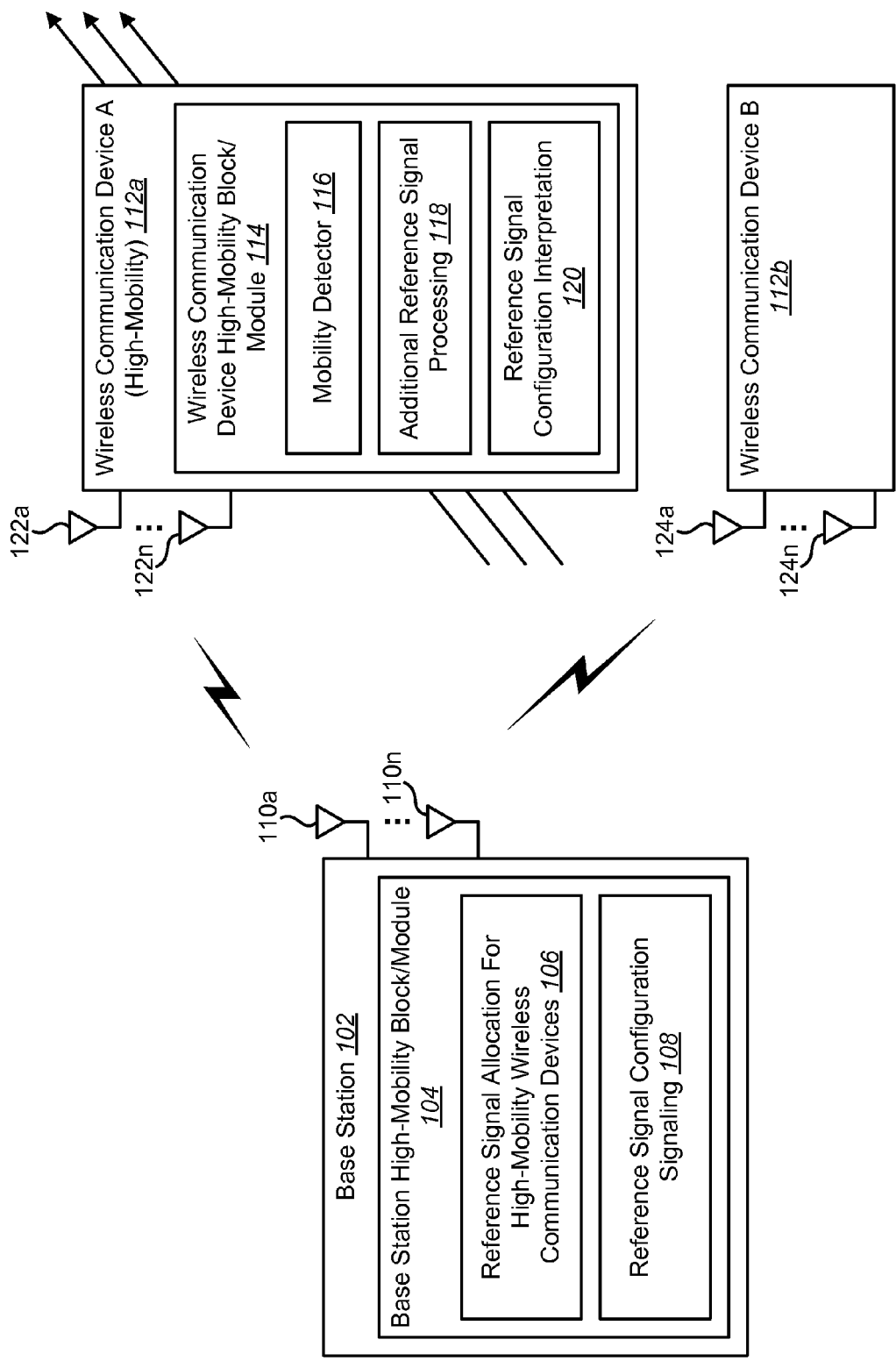
FIG. 1 is a block diagram illustrating one configuration of a base station and a wireless communication device in which systems and methods for reference signaling for a high-mobility wireless communication device may be implemented.

It should be noted that the systems and methods disclosed herein may be described in terms of one or more specifications, such as the $3^{rd}$ Generation Partnership Project (3GPP) Release-8 (Rel-8), 3GPP Release-9 (Rel-9), 3GPP Release-10 (Rel-10), Long-Term Evolution (LTE), LTE-Advanced (LTE-A), etc. However, at least some of the concepts described herein may be applied to other wireless communication systems. For example, the term User Equipment (UE) may be used to refer to the more general term "wireless communication device." Furthermore, one or more of the terms Node B, Evolved Node B (eNB), Home Evolved Node B (HeNB), etc., may be used to refer to the more general term "base station."

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as 3GPP Long Term Evolution (LTE) and others (e.g., where a base station may be referred to as a Node B, evolved Node B (eNB), etc.). Other examples of standards that a base station may comply with include Institute of Electrical and Electronics Engineers (IEEE) 802.16 (e.g., Worldwide Interoperability for Microwave Access or "WiMAX") and "Wi-Fi" standards (e.g., IEEE 802.11a, 802.11b, 802.11g, 802.11n and 802.11ac standards, etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a kind of electronic device (e.g., access terminal, client device, client station, etc.) that may wirelessly connect to a base station or other device. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smartphones, wireless modems, e-readers, tablet devices, gaming systems, etc. Wireless communication devices may operate in accordance with one or more industry standards (e.g., 3GPP standards, etc.) as described above in connection with base stations. Thus, the general term "wireless communication device" may include wireless communication devices described with varying nomenclatures according to industry standards (e.g., access terminal, user equipment (UE), remote terminal, etc.).

One example of the systems and methods disclosed herein describes an enhanced User Equipment-specific Reference Signal (UE-RS) design for high-mobility User Equipments (UEs) in Long-Term Evolution: A (LTE-A). More detail on this example is given hereafter.

In LTE Release-8 and Release-9, each UE is semi-statically configured with a downlink transmission mode. There are seven transmission modes defined in Release-8 and one additional transmission mode defined in Release-9. In particular, Table (1) below illustrates several modes as specified in 3GPP TS 36.213, Evolved Universal Radio Access (E-UTRA); Physical Layer Procedures. An eighth mode (e.g., Mode 8) is given in Release-9, which provides dual-stream beamforming based on two UE-RS antenna ports. Note that, while Modes 1-6 rely on Common Reference Signals (CRS), Mode 7 and Mode 8 rely on UE-specific RS (UE-RS). It should also be noted that several abbreviations may be used herein, including DCI for "Downlink Control Information," C-RNTI for "Cell Radio Network Temporary Identifier," PDSCH for "Physical Downlink Shared Channel," PDCCH for "Physical Downlink Control Channel," PBCH for "Physical Broadcast Channel" and CDD for "Cyclic Delay Diversity."

TABLE (1)

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |

In LTE-A, up to rank-8 (e.g., up to 8 spatial layers) PDSCH transmissions can be supported. For PDSCH demodulation, UE-RS may be used (versus CRS, for example) for improved overhead efficiency and link efficiency. In particular, a UE-RS pattern may be used for subframes in normal Cyclic Prefix (CP) and a different UE-RS pattern may be used for subframes in extended Cyclic Prefix (CP). Different ranks may be differentiated by Code-Division Multiplexing (CDM), Frequency-Division Multiplexing (FDM) or a combination of both. Additional UE-RS patterns may be used under different or special scenarios. As an example, special subframes in Time Division Duplexing (TDD) (e.g., Downlink Pilot Time Slot (DwPTS) subframes) may employ a different UE-RS pattern.

A discussion of low-mobility versus high-mobility UEs is given as follows. Current UE-RS designs (given in Release-8, Release-9 and LTE-A, for example) are based on low-mobility UEs (e.g., UEs that are moving at a relatively low rate of speed). In one configuration, there are 12 Resource Elements (REs) assigned to one UE-RS port per Resource Block (RB). For high-mobility UEs (e.g., UEs that are moving at a relatively high rate of speed), it has been shown that there is performance degradation when compared with a higher density UE-RS design. In particular, a higher-density UE-RS design may use increased time density to deal with smaller channel coherence time. A higher-density UE-RS design may use one or more additional UE-RS in addition to "baseline" UE-RS. For example, one or more additional UE-RS may be added to a subframe in order to increase a UE-RS time density for high-mobility UEs. It should be noted that "baseline UE-RS" may be UE-specific reference signals (UE-RS) that are typically allocated (based on a low-mobility UE, for example) or UE-RS used as specified in earlier 3GPP releases. While several different patterns of increased UE-RS time density may be used according to the systems and methods disclosed herein, the systems and methods disclosed herein also describe how to enable supporting higher-density UE-RS patterns for high-mobility UEs.

One previous proposal or approach combines a CRS and UE-specific RS (UE-RS) to achieve increased reference signal density. While combining the CRS and UE-RS may increase the total Reference Signal (RS) density, that approach involves several complexities, which are described hereafter. Due to CRS, precoding may need to be disabled. However, in correlated antenna systems, significant beamforming gain via precoding may be achieved. In Multimedia Broadcast over a Signal Frequency Network (MBSFN) subframes, no CRS ports may be present in the data region. The desirable number of additional reference signal Resource Elements (REs) to support high-mobility UEs may be different from the number of REs due to CRS. For instance, if there are four CRS ports, and hence 16 REs per Resource Block (RB) in a data region, there may be a need to limit the number of REs to eight per RB (in addition to the existing 12 UE-RS REs, thus giving a total of 20 reference signal REs), which may be done by only enabling the first 2 CRS ports.

The systems and methods disclosed herein provide a different way of supporting higher density UE-RS patterns for high-mobility UEs. High-mobility UEs may not typically support higher rank transmissions. For example, a high-mobility UE may typically have r=1, where r denotes (transmission) rank. Rank is the number of spatial layers used for transmission. One or more additional UE-RS may be added to a pattern with one or more baseline UE-RS as follows.

For a certain rank r transmission, the same Release-8, Release-9 and/or LTE-A UE-RS ports (which are denoted "baseline UE-RS") may be applied. In addition, the UE is informed that additional UE-RS ports (denoted "additional UE-RS") are also present. In one configuration, the additional UE-RS may be present in the same symbol(s) that include the baseline UE-RS. Additionally or alternatively, the additional UE-RS ports may be present in symbols that do not include the baseline UE-RS. Furthermore, the additional UE-RS ports may use some of the REs originally used for CRS.

The additional UE-RS ports may be designed such that the optimal UE-RS pattern (e.g., baseline with additional UE-RS) may be realized to support high-mobility UEs. The same precoding may be applied to the additional UE-RS that is applied to the baseline UE-RS.

The same scrambling sequence and resource element mapping mechanism that is applied in the baseline UE-RS case may be similarly applied to the additional UE-RS as well. For example, the baseline UE-RS pattern may be kept as before. The additional UE-RS pattern may use the same procedure for generation as the baseline UE-RS pattern. However, the additional UE-RS pattern may not necessarily use the same scrambling sequence. In other words, a different scrambling sequence may be used. In one configuration, the UE-RS sequence to Resource Element (RE) mapping may follow frequency first and then time.

Data transmission rate-matching around the additional UE-RS pattern may be used. For example, when a Physical Downlink Shared Channel (PDSCH) is mapped to the Resource Elements (REs), it may only be mapped to those REs not occupied by the baseline UE-RS ports and the additional UE-RS ports. Alternatively, data transmission may be punctured in locations with the additional UE-RS (in one configuration, this may be similar to the handling of PDSCH overlapped with Primary Synchronization Signals (PSS) and Secondary Synchronization Signals (SSS) occupying the center six Resource Blocks (RBs) in certain subframes as in 3GPP Release-8, for example). For example, a PDSCH may be first mapped to the REs that are not occupied by the baseline UE-RS ports only, followed by PDSCH REs colliding with the additional UE-RS REs being punctured. Different UEs may be informed using the same additional UE-RS ports or different additional UE-RS ports (depending on the UE speed, for example).

The systems and methods disclosed herein also describe signaling the presence of additional UE-RS (e.g., signaling a configuration for additional UE-RS). This may be used, for example, to inform the UE that at least one additional UE-RS is being used or sent.

In one approach, a UE that is identified as high-mobility may be configured via a layer-3 limited rank transmission using UE-RS, where rank r≤R (and R is a maximum rank or rank limit), for example. For instance, if R=1, the UE is limited to rank 1 transmission only. More specifically, the configuration may be realized using a new layer-3 signaling message dedicated for this purpose. Alternatively, the configuration may be realized using an existing layer-3 signaling message by re-interpretation of the message. For example, in 3GPP LTE Release-8, a UE may be configured using a layer-3 signaling message of a codebook subset restriction. The codebook subset restriction may be such that the UE is restricted to report channel feedback based on the layer-3 configured subset. For instance, the UE can be configured to provide rank-1 channel feedback only. The limited rank transmission using UE-RS may reuse such a layer-3 signaling message by mapping the configured codebook subset restriction to the supportable ranks for PDSCH transmissions.

Additionally or alternatively, a set of possible additional UE-RS configurations may be explicitly specified using layer-3 signaling. For example, a two-bit indicator may be used as follows. 00 may indicate that there is no additional UE-RS, 01 may indicate that additional UE-RS corresponding to six more REs is/are used, 10 may indicate that additional UE-RS corresponding to 12 more REs is/are used and 11 may be reserved. This may be applied to non-Multimedia Broadcast over a Single Frequency Network (non-MBSFN) subframes and/or to Multimedia Broadcast over a Single Frequency Network (MBSFN) subframes. More detail regarding this approach is given below.

Alternatively, whether additional UE-RS may be used or not may be indicated via a Physical Downlink Control Channel (PDCCH). This may be done explicitly or implicitly. When explicitly signaled on the PDCCH, for example, a two-bit indicator may be used. When implicitly signaled (in LTE-A, for example), a UE may be informed of the number of UE-RS ports for PDSCH transmission. If the number of UE-RS ports signaled in the PDCCH, denoted as S, is no larger than a layer-3 configured maximum rank R, this may indicate no additional UE-RS ports. Otherwise (when S>R, for example), the set of UE-RS ports to be used may be implicitly derived based on the difference between S and R. For example, if S−R=1, this may indicate a value of 01 (e.g., that additional UE-RS corresponding to six more REs is/are used as in the example above). Furthermore, if S−R≥2, this may indicate a value of 10 (e.g., that additional UE-RS corresponding to 12 more REs is/are used as in the example above).

In some configurations, signaling may be used to distinguish between Multimedia Broadcast over a Single Frequency Network (MBSFN) subframes and non-Multimedia Broadcast over a Single Frequency Network (non-MBSFN) subframes. Since Multimedia Broadcast over a Single Frequency Network (MBSFN) subframes may not carry CRS in a data region, there may be a need to distinguish Multimedia Broadcast over a Single Frequency Network (MBSFN) subframes versus non-Multimedia Broadcast over a Single Frequency Network (non-MBSFN) subframes. In one approach, a CRS plus baseline UE-RS approach may be mixed with an additional UE-RS plus baseline UE-RS approach. For instance, (as an extension of a previous example), a value of 00 may indicate that no additional UE-RS is used, but that CRS are used instead. In this case, for example, in addition to the baseline UE-RS, the Release-8 CRS may be additionally used. For instance, the CRS may be limited to the bandwidth occupied by the PDSCH (with truncated CRS). The truncated CRS may be precoded with the same precoding as the baseline UE-RS. Alternatively, the CRS may not be precoded. Thus, one example of the systems and methods disclosed herein describes how to enhance UE-RS design for high-mobility UEs in Long-Term Evolution: A (LTE-A).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a base station 102 and a wireless communication device 112 in which systems and methods for reference signaling for a high-mobility wireless communication device 112a may be implemented. Examples of a base station 102 include Node Bs and evolved Node Bs (eNBs), etc. The base station 102 communicates with one or more wireless communication devices 112 using one or more antennas 110a-n. For example, the base station 102 communicates with (high-mobility) wireless communication device A 112a and wireless communication device B 112b. Wireless communication device A 112a may communicate with the base station 102 using one or more antennas 122a-n and wireless communication device B 112b may communicate with the base station 102 using one or more antennas 124a-n.

The base station 102 generates and sends reference signals to the one or more wireless communication devices 112a-b. For example, the one or more wireless communication devices 112a-b may use the reference signals to generate feedback or control information. In one configuration, a wireless communication device 112 uses one or more reference signals to compute a Channel Quality Indicator (CQI), Precoding Matrix Indicator (PMI) and/or a Rank Indicator (RI). For example, the Channel Quality Indicator (CQI) is an indication of channel quality, the Precoding Matrix Indicator (PMI) indicates information (e.g., antenna weighting) that the base station 102 may use to precode its transmissions and the Rank Indicator (RI) may indicate a number of streams or layers that can be supported by the wireless communication device 112. The one or more wireless communication devices 112a-b may send the feedback or control information to the base station 102.

In a conventional approach, it may have been assumed that a wireless communication device 112 is traveling within a certain range of speeds. For instance, typical human walking or driving speeds can be imputed to assumed wireless communication device 112 speeds. These ranges of speeds may be assumed for optimizing the performance of various uplink (e.g., from a wireless communication device 112 to the base station 102) and downlink (e.g., from the base station 102 to a wireless communication device 112) wireless channels. Thus, for instance, a reference signal or physical shared channel could be configured based on optimal performance for wireless communication devices 112 traveling at a nominal rate of movement (e.g., between zero and 150 km/hr), or some other suitable rate of movement. However, degradation of those signals may occur for wireless communication devices 112 traveling at a much higher rate (e.g., 250 kilometers per hour (km/hr) or more). Thus, for instance, (high-mobility) wireless communication device A 112a traveling at high speed might observe lower throughput, data rates, signal quality, increased jitter, or the like, as compared with wireless communication device B 112b traveling at the nominal rate of movement. For example, a wireless communication device 112 may be designated as "high-mobility" if it is traveling at 120 km/hr or faster. Different speeds (e.g., 60 km/hr) may be used to categorize wireless communication devices 112 as "high-mobility." This categorization may be further dependent on a carrier frequency used. For example, a threshold speed for categorizing wireless communication devices 112 as "high-mobility" may vary depending on a carrier frequency being used for communication.

The systems and methods disclosed herein may be applied in order to alleviate possibly degraded communications between the base station 102 and a high-mobility wireless communication device 112. High-mobility wireless communication device A 112a includes a wireless communication device high-mobility block/module 114, which may be implemented in hardware, software or a combination of both. The wireless communication device high-mobility block/module 114 may include a mobility detector 116, an additional reference signal processing block/module 118 and/or a reference signal configuration interpretation block/module 120.

The mobility detector 116 detects the movement (e.g., speed) of high-mobility wireless communication device A 112a. In one configuration, the mobility detector 116 comprises an accelerometer used to estimate movement (e.g., speed). Additionally or alternatively, the mobility detector 116 comprises a Global Positioning System (GPS) device that may be used to estimate movement (e.g., speed). When the mobility detector 116 detects that wireless communication device A 112a is moving faster than some threshold speed (e.g., 120 km/hr), wireless communication device A 112a may transmit an indicator to the base station 102 that indicates wireless communication device A 112a is a high-mobility wireless communication device 112. In one configuration, wireless communication device A 112a sends a message indicating its speed. In another configuration, wireless communication device A 112a sends some other indicator or message (e.g., a high-mobility service request) to the base station 102 indicating that it is a high-mobility wireless communication device 112. The base station 102 receives the message or indicator that indicates that wireless communication device A 112a is "high-mobility."

The base station 102 includes a base station high-mobility block/module 104. The base station high-mobility block/module 104 may be implemented in hardware, software or a combination of both. The base station high-mobility block/module 104 may include one or more hardware blocks and/or one or more software modules. The base station high-mobility block/module 104 may include a reference signal allocation for high-mobility wireless communication devices block/module 106 and/or a reference signal configuration signaling block/module 108.

The reference signal allocation for high-mobility wireless communication devices block/module 106 may be implemented as hardware, software or a combination of both. The reference signal allocation for high-mobility wireless communication devices block/module 106 allocates one or more additional reference signals that are specific to one or more wireless communication devices 112 (e.g., UE-specific RS). For example, when the base station 102 receives the high-mobility indicator from high-mobility wireless communication device A 112a, the base station 102 allocates additional reference signals to be transmitted to it 112a. This increases the time density of reference signals in a signaling pattern. Increasing the number of reference signals may allow a higher rate of feedback from wireless communication device A 112a, thereby possibly improving or maintaining link quality (or avoiding link degradation).

The reference signal configuration signaling block/module 108 signals whether additional reference signals are being used. For example, it 108 sends an indication to high-mobility wireless communication device A 112a that indicates whether additional reference signals are used and their location in time and frequency (e.g., which resource element they are mapped to). For example, this may be signaled using a layer-3 limited rank transmission, explicit layer-3 signaling and/or PDCCH signaling. Thus, for example, the base station 102 signals that one or more additional reference signals are being used, allocates the one or more additional reference signals and transmits them to high-mobility wireless communication device A 112a.

High-mobility wireless communication device A 112a uses the reference signal configuration interpretation block/module 120 to determine whether one or more additional reference signals are being sent and their location in time and frequency (e.g., which resource element they are mapped to). For example, this block/module 120 interprets or decodes a reference signal configuration signal received using a layer-3 limited rank transmission interpretation, explicit layer-3 signaling interpretation and/or PDCCH signaling interpretation to determine whether additional reference signal(s) will be used and their location.

When one or more additional specific reference signals are used, the additional reference signal processing block/module 118 processes the additional specific reference signal(s) (as indicated by the reference signal configuration interpretation block/module 120, for example). For example, the additional reference signal(s) may be used to generate feedback indicators or messages that are sent to the base station 102.

Figure 2:
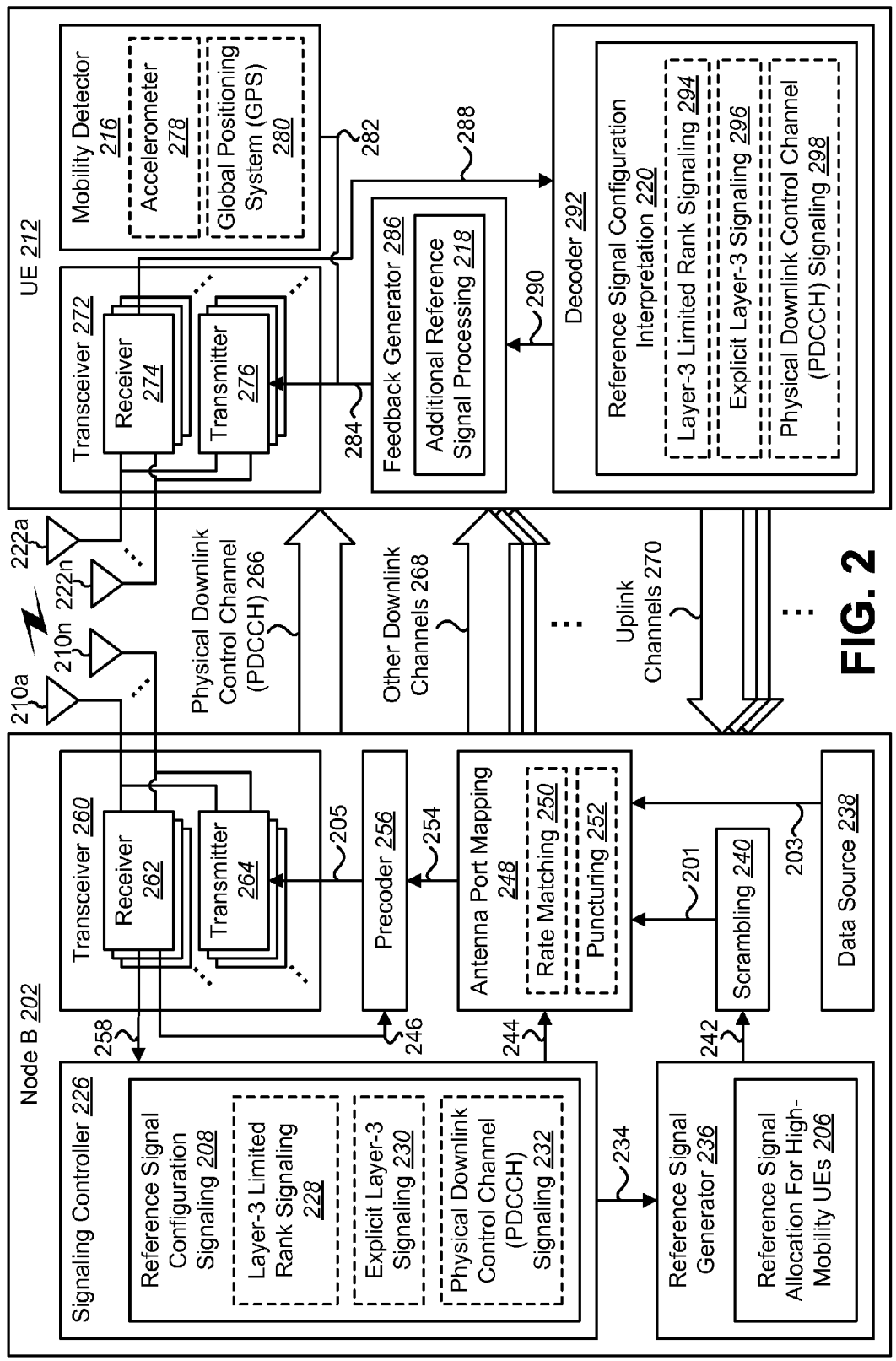
FIG. 2 is a block diagram illustrating one configuration of a Node B and one or more User Equipments (UEs) in which systems and methods for reference signaling for a high-mobility wireless communication device may be implemented.

FIG. 2 is a block diagram illustrating one configuration of a Node B 202 and one or more User Equipments (UEs) 212 in which systems and methods for reference signaling for a high-mobility wireless communication device may be implemented. Examples of the Node B 202 include Node Bs and evolved Node Bs (eNBs). The Node B 202 communicates with one or more UEs 212 using a transceiver 260 and one or more antennas 210a-n. The UE 212 may communicate with the Node B 202 using a transceiver 272 and one or more antennas 222a-n. Communication between the Node B 202 and one or more UEs 212 may take place on channels. For example, the Node B 202 may send information to the UE 212 using a PDCCH 226 and one or more other downlink channels 268. One example of another downlink channel 268 is a PDSCH, which may carry information to one or more UEs 212. One or more UEs 212 may send information to the Node B 202 using one or more uplink channels 270.

The Node B 202 includes a signaling controller 226, reference signal generator 236, transceiver 260, precoder 256, antenna port mapping block/module 248, scrambling block/module 240 and/or a data source 238. As used herein, a "block/module" may be implemented in hardware, software or a combination of both. The transceiver 260 includes one or more receivers 262 and one or more transmitters 264 that are coupled to the one or more antennas 210a-n. In one configuration, the one or more receivers 262 receive and/or demodulate signals received from the one or more antennas 210a-n. The one or more transmitters 264 may modulate and/or transmit signals.

The UE 212 includes a transceiver 272, mobility detector 216, feedback generator 286 and decoder 292. The transceiver 272 includes one or more receivers 274 and one or more transmitters 276 that are coupled to the one or more antennas 222a-n. In one configuration, the one or more receivers 274 receive and/or demodulate signals received from the one or more antennas 222a-n. The one or more transmitters 276 may modulate and/or transmit signals.

The mobility detector 216 is a block and/or module that detects the movement (e.g., speed) of the UE 212. In one configuration, the mobility detector 216 comprises an accelerometer 278 used to estimate movement (e.g., speed). Additionally or alternatively, the mobility detector 216 comprises a Global Positioning System (GPS) device 280 that may be used to estimate movement (e.g., speed). When the mobility detector 216 detects that UE 212 is moving faster than some threshold speed (e.g., 120 km/hr), it 216 sends a high-mobility indicator 282 to the transmitter(s) 276 for transmission to the Node B 202. The transmitter(s) 276 transmit the indicator to the Node B 202 that indicates the UE 212 as a high-mobility UE 212. In one configuration, UE 212 sends a message indicating its speed.

In another configuration, UE 212 sends some other indicator or message (e.g., a high-mobility service request) to the Node B 202 indicating that it is a high-mobility UE 212. The Node B 202 receives the message or indicator that indicates that UE 212 is "high-mobility" using its receiver(s) 262.

The receiver(s) 262 send the received high-mobility indicator or message 258 to the signaling controller 226. The signaling controller is a block and/or module that controls the Node B's signaling and the signaling of one or more UEs 212. For example, the signaling controller 226 may allocate communication resources (e.g., time/frequency resources, resource blocks (RBs), REs, etc.) for communicating information (e.g., control information and/or payload data) to one or more UEs 212.

The signaling controller 226 includes a reference signal configuration signaling block/module 208, which may be implemented as one or more hardware blocks and/or one or more software modules. The reference signal configuration signaling block/module 208 may include one or more of a layer-3 limited rank signaling block/module 228, an explicit layer-3 signaling block/module 230 and a PDCCH signaling block/module 232. In one configuration, the Node B 202 includes only one of the three blocks/modules 228, 230, 232. In another configuration, the Node B 202 includes two or more of the blocks/modules 228, 230, 232. The layer-3 limited rank signaling block/module 228, the explicit layer-3 signaling block/module 230 and/or the PDCCH signaling block/module 232 may be used to signal to the UE 212 whether additional UE-specific reference signals (UE-RS) will be allocated for and/or sent to the UE 212. In other words, the signaling controller 226 may provide information and/or instructions 244 to the antenna port mapping block/module 248 that indicate whether additional UE-RS is used and the location (e.g., in time and frequency or in REs) of the additional UE-RS. This indication, information or instruction 244 may be referred to as a reference signal configuration 244. The reference signal configuration 244 may be signaled to the UE 212. In one configuration, the reference signal configuration 244 may be used for allocating and/or mapping reference signals to REs and/or antenna ports. The reference signal configuration 244 may be mapped by an antenna port mapping block/module 248, precoded by a precoder 256 and transmitted to the UE 212 using one or more transmitters 264 and one or more antennas 210a-n.

For example, when the signaling controller 226 receives the high-mobility message or indicator 258 from the receiver, it 226 may use one or more of the signaling modules 228, 230, 232 to send a reference signal configuration indicator or message to the UE 212. In the case where the reference signal configuration signaling block/module 208 includes more than one signaling block/module 228, 230, 232, it 208 may select one or more of the signaling blocks/modules 228, 230, 232 to send the reference signal configuration indicator or message to the UE 212. This selection may be based on current downlink channel 266, 268 traffic and/or channel quality, for example. The Node B 202 may also send an explicit or implicit indication to the UE 212 that indicates which of the signaling blocks/modules 228, 230, 232 is/are being used.

A UE 212 that is identified as high-mobility may be configured via layer-3 limited rank signaling 228 using UE-RS, where rank r≤R (and R is a maximum rank or rank limit), for example. For instance, if R=1, the UE 212 is limited to rank 1 transmission only. In other words, a high-mobility UE 212 may be restricted to one or more certain ranks. This may be separately configured, or may be accomplished using a codebook subset restriction mechanism. More specifically, the configuration may be realized using a new layer-3 signaling message dedicated for this purpose. Alternatively, the configuration may be realized using an existing layer-3 signaling message by re-interpretation of the message. For example, in 3GPP LTE Release-8, a UE may be configured using a layer-3 signaling message of a codebook subset restriction. The codebook subset restriction may be such that the UE 212 is restricted to report channel feedback based on the layer-3 configured subset. For instance, the UE 212 can be configured to provide rank-1 channel feedback only. The limited rank transmission using UE-RS may reuse such a layer-3 signaling message by mapping the configured codebook subset restriction to the supportable ranks for PDSCH transmissions. It should be noted that in one configuration, layer-3 signaling may be Radio Resource Control (RRC) signaling.

Alternatively or additionally, explicit layer-3 signaling 230 may be used. In this case, a set of possible additional UE-RS configurations may be explicitly specified using explicit layer-3 signaling 230. For example, a two-bit indicator may be used as follows. 00 may indicate that there is no additional UE-RS, 01 may indicate that additional UE-RS corresponding to six more REs is/are used, 10 may indicate that additional UE-RS corresponding to 12 more REs is/are used and 11 may be reserved. This may be applied to non-Multimedia Broadcast over a Single Frequency Network (non-MBSFN) subframes and/or to Multimedia Broadcast over a Single Frequency Network (MBSFN) subframes.

Alternatively, PDCCH signaling 232 may be used to indicate whether additional UE-RS may be used or not. In this case, the information indicating additional UE-RS (or not) may be sent on the PDCCH 266. This may be done explicitly or implicitly. For example, a two-bit indicator may be used for explicit PDCCH signaling 232. In some configurations, the two-bit patterns employed may be similar to that illustrated above for explicit layer-3 signaling. When using implicit PDCCH signaling (in LTE-A, for example), the UE 212 may be informed of the number of UE-RS ports for PDSCH (e.g., one of the other downlink channels 268) transmission. If the number of UE-RS ports signaled in the PDCCH 266, denoted as S, is no larger than a layer-3 configured maximum rank R, this may indicate no additional UE-RS ports. Otherwise (when S>R, for example), the set of UE-RS ports to be used may be implicitly derived based on the difference between S and R. For example, if $S-R=1$, this may indicate that additional UE-RS corresponding to six more REs is/are used as in the example above (e.g., a value of 01). Furthermore, if $S-R \geq 2$, this may indicate that additional UE-RS corresponding to 12 more REs is/are used as in the example above (e.g., a value of 10).

In some configurations, signaling may be used to distinguish between Multimedia Broadcast over a Single Frequency Network (MBSFN) subframes and non-Multimedia Broadcast over a Single Frequency Network (non-MBSFN) subframes. Since Multimedia Broadcast over a Single Frequency Network (MBSFN) subframes may not carry CRS in a data region, there may be a need to distinguish Multimedia Broadcast over a Single Frequency Network (MBSFN) subframes versus non-Multimedia Broadcast over a Single Frequency Network (non-MBSFN) subframes. In one approach, a CRS plus baseline UE-RS approach may be mixed with an additional UE-RS plus baseline UE-RS approach. For instance, (as an extension of a previous example), a value of 00 may indicate that no additional UE-RS is used, but that CRS are used instead. In this case, for example, in addition to the baseline UE-RS, the Release-8 CRS may be additionally used. For instance, the CRS may be limited to the bandwidth occupied by the PDSCH (with truncated CRS). The truncated CRS may be precoded with the same precoding as the baseline UE-RS. Alternatively, the CRS may not be precoded. Thus, one example of the systems and methods disclosed herein describes how to enhance UE-RS design for high-mobility UEs in Long-Term Evolution: A (LTE-A).

The signaling controller 226 may notify or send an instruction 234 to the reference signal generator 236 that additional UE-RS will be used (for a high-mobility UE 212). This notification or instruction 234 may be a reference signal configuration or may be some other instruction or indication. The reference signal generator 236 may be a hardware block and/or software module used to generate reference signals. It should be noted that CRS and UE-specific Reference Signals (UE-RS) may be generated by the reference signal generator 236. In one configuration, a reference signal comprises a pattern of resource elements, where a resource element represents a resource unit of a frequency tone in an Orthogonal Frequency-Division Multiplexing (OFDM) symbol for a particular antenna port, which is known to the UE 212. CRS are reference signals that may be used by multiple UEs 212 or any UE 212. A UE-specific reference signal (UE-RS) may be specific or intended for only one or more particular UEs 212.

The reference signal generator 236 includes a reference signal allocation for high-mobility UEs block/module 206. When the reference signal generator 236 receives the notification or instruction 234 that additional UE-RS will be used (for a high-mobility UE 212), the reference signal allocation for high-mobility UEs block/module 206 generates one or more additional specific reference signals (e.g., UE-RS) that are allocated to the UE 212. These additional UE-RS (possibly in addition to CRS and/or other baseline UE-RS signals) 242 are provided to a scrambling block/module 240.

The scrambling block/module 240 scrambles the additional UE-RS (e.g., in addition to CRS and other baseline UE-RS) 242 to produce scrambled reference signals 201, which are provided to the antenna port mapping block/module 248. The same scrambling sequence and resource element mapping mechanism that is applied in the baseline UE-RS case may be similarly applied to the additional UE-RS as well. For example, the baseline UE-RS pattern may be kept as before (as used in 3GPP specifications, for example). The additional UE-RS pattern may use the same procedure for generation as the baseline UE-RS pattern. However, the additional UE-RS pattern may not necessarily use the same scrambling sequence. In other words, a different scrambling sequence may be used.

The antenna port mapping block/module 248 receives the scrambled reference signals 201. The antenna port mapping block/module 248 may also receive data 203 (e.g., voice, video, data, etc.) from a data source 238. For example, the Node B 202 may have data 203 for transmission to the UE 212. Examples of this data 203 include voice data (from another UE, telephone or other device), video data, audio data, Internet data, control data, etc. The antenna port mapping block/module 248 may also receive information and/or instructions 244 from the signaling controller 226. The information and/or instructions 244 indicate, for example, whether additional UE-specific Reference Signals (UE-RS) are used and communication resources (e.g., REs) allocated for the additional UE-RS. For example, the information and/or instructions 244 comprise signaling or information regarding a reference signal configuration. The antenna port mapping block/module 248 maps reference signals 201 and/or data 203 to REs and/or antenna ports. Mapped information 254 is provided to the precoder 256. The mapped information 254 may include mapped reference signals, mapped data and/or a mapped reference signal configuration. It should be noted that the data 203, scrambled reference signals 201 and/or reference signal configuration 234 may be mapped to and transmitted on the same or different downlink channels 266, 268.

The antenna port mapping block/module 248 may use rate matching 250 and/or puncturing 252. More specifically, data transmission rate-matching 250 around the additional UE-RS pattern may be used. For example, when a PDSCH is mapped to REs, it may only be mapped to those REs not occupied by (e.g., allocated for) the baseline UE-RS ports and the additional UE-RS ports. Data 203 for the PDSCH may come from the data source 238.

Additionally or alternatively, the antenna port mapping block/module 248 may use puncturing 252. In one configuration, puncturing 252 refers to an operation where data transmission rate matching (e.g., rate matching 250) is only used around the baseline UE-RS pattern (initially). After the rate matching, for example, some REs (e.g., those PDSCH REs) corresponding to the additional UE-RS pattern are replaced by the additional UE-RS. That is, those PDSCH REs are "punctured" by the additional UE-RS pattern. More specifically, data transmission may be punctured in locations with the additional UE-RS (similar to the handling of PDSCH overlapped with Primary Synchronization Signals (PSS) and Secondary Synchronization Signals (SSS) occupying the center six Resource Blocks (RBs) in certain subframes as in 3GPP Release-8, for example). For example, a PDSCH (e.g., data 203) may be first mapped to the REs that are not occupied by the baseline UE-RS ports only, followed by PDSCH REs colliding with the additional UE-RS REs being punctured.

In one configuration, the UE-RS sequence-to-Resource Element (RE) mapping may follow frequency first and then time. Alternatively, the UE-RS sequence-to-RE mapping may follow time first and then frequency. Different UEs 212 may be informed using the same additional UE-RS ports or different additional UE-RS ports (depending on the UE 212 speed, for example).

The precoder 256 precodes the mapped reference signals and/or data 254. Precoding involves assigning weights for particular antennas 210a-n in order to beamform the signal transmitted to one or more UEs 212. The precoder 256 may use received feedback 246 in order to precode the reference signals and/or data 254. In one configuration, the received feedback 246 comprises a Precoding Matrix Indicator (PMI) that was generated by the UE 212 based on a received reference signal. The precoder 256 generates a precoded signal 205 using the mapped reference signal configuration, reference signals and/or data 254. The precoded signal 205 is provided to and transmitted by the one or more transmitters 264 and one or more antennas 210a-n. The reference signals and/or data are transmitted to the UE 212.

The UE 212 receives the signal (e.g., reference signal configuration, reference signals and/or data) from the Node B 202 using its one or more antennas 222a-n and one or more receivers 274. The received signal 288 is provided to the decoder 292. The received signal 288 may include a reference signal configuration, one or more reference signals and/or data. The decoder 292 includes a reference signal configuration interpretation block/module 220. The reference signal configuration interpretation block/module 220 may receive the reference signal configuration.

The reference signal configuration interpretation block/module 220 may interpret or "decode" the reference signal configuration. The reference signal configuration interpretation block/module 220 may include one or more of a layer-3 limited rank signaling interpretation block/module 294, an explicit layer-3 signaling interpretation block/module 296 and/or a PDCCH signaling interpretation block/module 298 (it should be noted that "interpretation" is omitted from FIG. 2 for these blocks/modules 294, 296, 298 for convenience). For example, the layer-3 limited rank signaling interpretation block/module 294 may interpret a reference signal configuration received via layer-3 limited rank signaling 228 using UE-RS, where rank r≤R (and R is a maximum rank or rank limit). For instance, if R=1, the UE 212 is limited to rank 1 transmission only. This may be separately configured, or may be accomplished using a codebook subset restriction mechanism. More specifically, the configuration may be realized using a new layer-3 signaling message dedicated for this purpose. Alternatively, the configuration may be realized using an existing layer-3 signaling message by re-interpretation of the message. For example, in 3GPP LTE Release-8, a UE 212 may be configured using a layer-3 signaling message of a codebook subset restriction. The codebook subset restriction may be such that the UE is restricted to report channel feedback based on the layer-3 configured subset. For instance, the UE can be configured to provide rank-1 channel feedback only. The limited rank transmission using UE-RS may reuse such a layer-3 signaling message by mapping the configured codebook subset restriction to the supportable ranks for PDSCH transmissions. The reference signal configuration interpretation block/module 220 may determine whether (one or more) additional UE-RS are being sent and their location (e.g., location in time and frequency or resource element (RE), etc.) using a layer-3 limited rank signaling interpretation block/module 294.

Alternatively or additionally, the UE 212 may interpret or decode the reference signal configuration using the explicit layer-3 signaling interpretation block/module 296. In this case, a set of possible additional UE-RS configurations may be explicitly specified using explicit layer-3 signaling 230. For example, a two-bit indicator may be used as follows. 00 may indicate that there is no additional UE-RS, 01 may indicate that additional UE-RS corresponding to six more REs is/are used, 10 may indicate that additional UE-RS corresponding to 12 more REs is/are used and 11 may be reserved. This may be applied to non-Multimedia Broadcast over a Single Frequency Network (non-MBSFN) subframes and/or to Multimedia Broadcast over a Single Frequency Network (MBSFN) subframes. Thus, the UE 212 may interpret the reference signal configuration using the explicit layer-3 signaling interpretation block/module 296.

Alternatively, the UE 212 may interpret or decode the reference signal configuration using a PDCCH signaling interpretation block/module 298. In this case, the information indicating additional UE-RS (or not) may be received on the PDCCH 266. This may be done explicitly or implicitly. For example, a two-bit indicator may be used for explicit PDCCH signaling 232. In some configurations, the two-bit patterns employed may be similar to that illustrated above for explicit layer-3 signaling. When using implicit PDCCH signaling (in LTE-A, for example), the UE 212 may be informed of the number of UE-RS ports for PDSCH (e.g., one of the other downlink channels 268) transmission. If the number of UE-RS ports signaled in the PDCCH 266, denoted as S, is no larger than a layer-3 configured maximum rank R, this may indicate no additional UE-RS ports. Otherwise (when S>R, for example), the set of UE-RS ports to be used may be implicitly derived based on the difference between S and R. For example, if S−R=1, this may indicate that additional UE-RS corresponding to six more REs is/are used as in the example above (e.g., a value of 01). Furthermore, if S−R≥2, this may indicate that additional UE-RS corresponding to 12 more REs is/are used as in the example above (e.g., a value of 10). Thus, the UE 212 may interpret or decode the reference signal configuration using a PDCCH signaling interpretation block/module 298. In the case where the UE 212 includes more than one interpretation block/module 294, 296, 298, the UE 212 may determine one or more interpretation block/ modules 294, 296, 298 to use based on implicit or explicit signaling from the Node B 202.

In some configurations, signaling may be used to distinguish between Multimedia Broadcast over a Single Frequency Network (MBSFN) subframes and non-Multimedia Broadcast over a Single Frequency Network (non-MBSFN) subframes. Since Multimedia Broadcast over a Single Frequency Network (MBSFN) subframes may not carry CRS in a data region, there may be a need to distinguish Multimedia Broadcast over a Single Frequency Network (MBSFN) subframes versus non-Multimedia Broadcast over a Single Frequency Network (non-MBSFN) subframes. In one approach, a CRS plus baseline UE-RS approach may be mixed with an additional UE-RS plus baseline UE-RS approach. For instance, (as an extension of a previous example), a value of 00 may indicate that no additional UE-RS is used, but that CRS are used instead. In this case, for example, in addition to the baseline UE-RS, the Release-8 CRS may be additionally used. For instance, the CRS may be limited to the bandwidth occupied by the PDSCH (with truncated CRS). The truncated CRS may be precoded with the same precoding as the baseline UE-RS. Alternatively, the CRS may not be precoded. This distinction may be detected by the reference signal configuration interpretation block/module 220.

The decoder 292 may provide information and/or instructions 290 to the feedback generator 286. The information and/or instructions 290 may comprise a reference signal configuration interpretation that indicates whether additional UE-RS is/are used and/or their locations (in time and frequency or REs). The information and/or instructions 290 may additionally or alternatively include reference signals. The feedback generator 286 may use the information and/or instructions 290 to generate feedback 284. The feedback generator 286 may include an additional reference signal processing block/module 218.

When additional UE-RS is/are used, the feedback generator 286 may locate and/or process the additional UE-RS using the additional reference signal processing block/module 218. For example, the feedback generator 286 may use the additional reference signals to generate feedback or control information. In one configuration, feedback generator 286 uses one or more reference signals to compute a Channel Quality Indicator (CQI), Precoding Matrix Indicator (PMI) and/or a Rank Indicator (RI). For example, the Channel Quality Indicator (CQI) is an indication of channel quality, the Precoding Matrix Indicator (PMI) includes information (e.g., antenna weighting, phase information, etc.) that the Node B 202 may use to precode its transmissions and the Rank Indicator (RI) may indicate a number of streams or layers that can be supported by the UE 212. The feedback generator 286 may provide this feedback 284 to the one or more transmitters 276 to transmit it to the Node B 212 using one or more antennas 222a-n on one or more uplink channels 270. The Node B 202 may use this feedback to improve or control communications between the Node B 202 and the UE 212 (e.g., for precoding).

Figure 3:
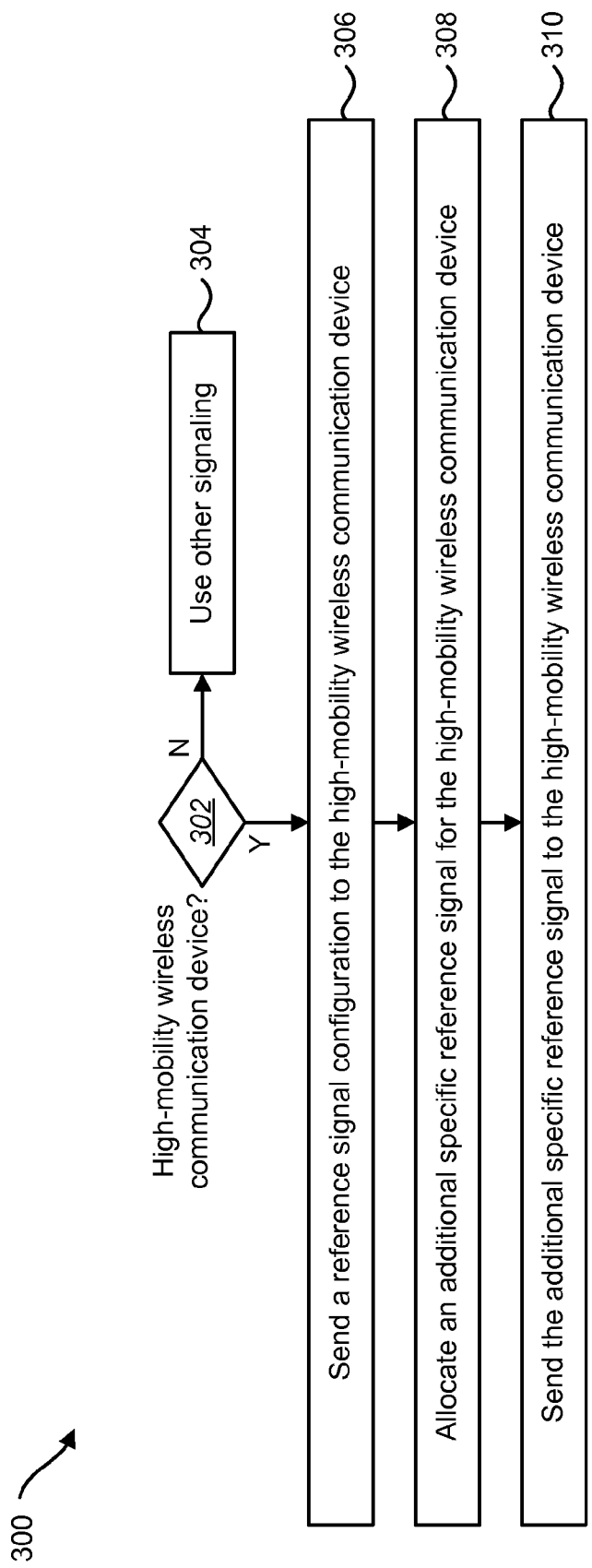
FIG. 3 is a flow diagram illustrating one configuration of a method for reference signaling for a high-mobility wireless communication device.

FIG. 3 is a flow diagram illustrating one configuration of a method 300 for reference signaling for a high-mobility wireless communication device. This may enable communication with a high-mobility wireless communication device. A base station 102 may identify 302 a high-mobility wireless communication device 112a. For example, the base station 102 may identify 302 a high-mobility wireless communication device 112a by receiving a high-mobility indicator (e.g., a speed measurement that meets or exceeds a high-mobility threshold, a high-mobility service request or some other indicator, etc.) from a high-mobility wireless communication device 112a. If the base station 102 does not identify a high-mobility wireless communication device 112a (e.g., the one or more wireless communication devices 112 that it 102 is communicating with are not high-mobility), then the base station 102 may use 304 other signaling. For example, the base station 102 may use 304 CRS and/or baseline specific reference signals for the wireless communication devices 112.

If the base station 102 identifies a high-mobility wireless communication device 112a (e.g., receives a high-mobility indicator), then the base station 102 may send 306 a reference signal configuration to the high-mobility wireless communication device 112a. For example, the base station 102 may generate and send 306 this reference signal configuration using a reference signal configuration signaling block/module 108. This may be done using layer-3 limited rank signaling, explicit layer-3 signaling and/or PDCCH signaling, for instance. This reference signal configuration may indicate to the high-mobility wireless communication device 112a whether additional (besides any "baseline" specific reference signals) specific reference signals (e.g., UE-RS) are being used and their location (e.g., in time and frequency or according to Resource Element (RE), etc.).

The base station 102 may allocate 308 an additional specific reference signal for the high-mobility wireless communication device 112a. For example, the base station 102 generates one or more additional specific reference signals and allocates communication resources (e.g., time and frequency resources, REs, etc.) for their transmission. This may be done using a reference signal allocation for high-mobility wireless communication devices block/module 106. For example, the base station 102 allocates six additional REs for the transmission of six additional specific reference signals. In one configuration, the additional specific reference signals may be transmitted using REs that are not used or occupied by CRS or baseline specific reference signals. In another configuration, one or more of the additional specific reference signals may be transmitted using REs that were originally allocated for CRS. In one configuration, the additional specific reference signal(s) may be transmitted using one or more REs that were originally allocated for baseline specific reference signals. Allocating additional specific reference signals may increase the time density of reference signals, enabling more frequent feedback and thus, improved communications between the base station 102 and the high-mobility wireless communication device 112a.

The base station 102 may send 310 the one or more additional specific reference signals to the high-mobility wireless communication device 112a. For example, the base station 102 may transmit the additional specific reference signals using one or more transmitters and one or more antennas.

Figure 4:
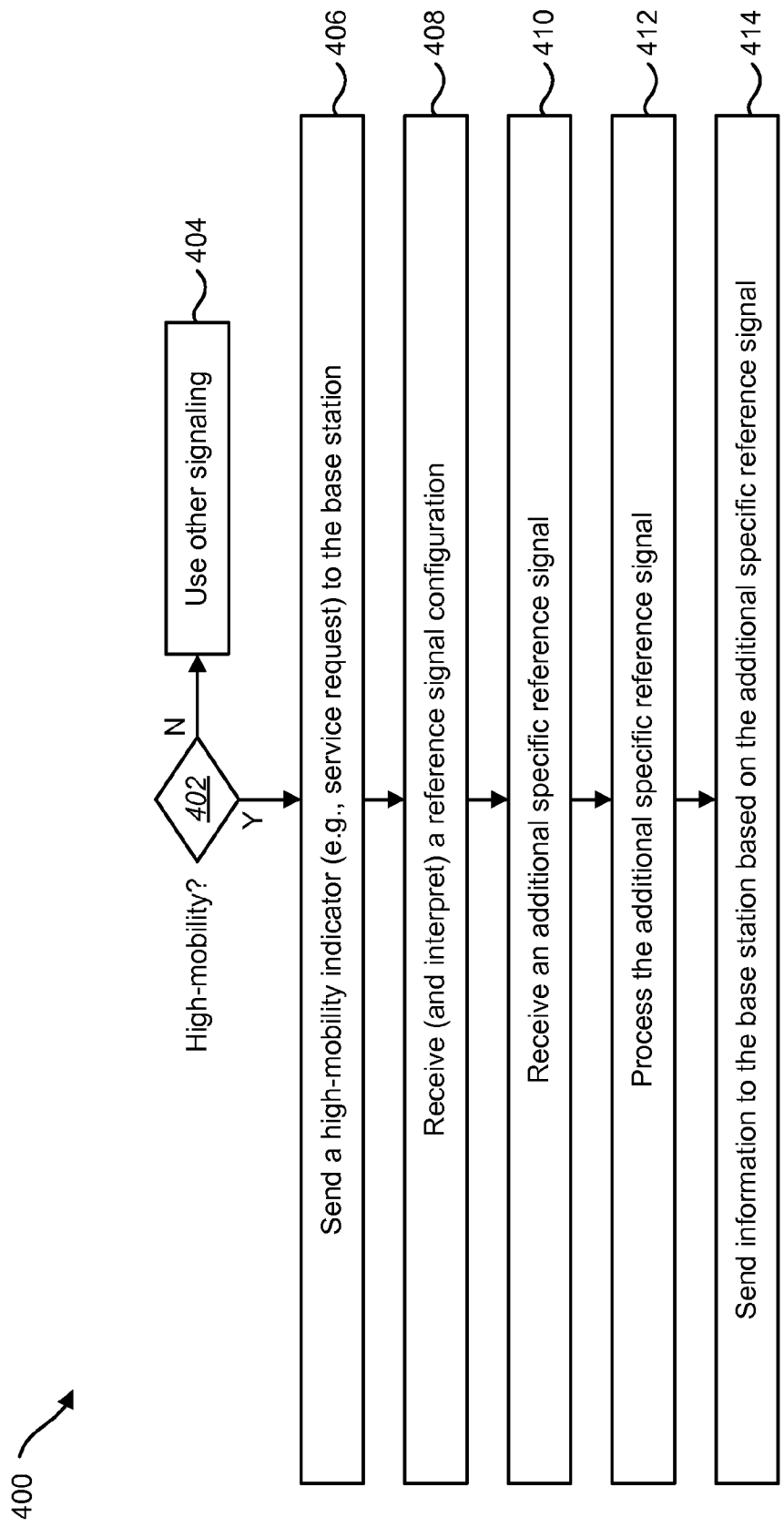
FIG. 4 is a flow diagram illustrating one configuration of a method for utilizing reference signaling for a high-mobility wireless communication device.

FIG. 4 is a flow diagram illustrating one configuration of a method 400 for utilizing reference signaling for a high-mobility wireless communication device 112a. A wireless communication device 112 may determine 402 whether it is (e.g., can be classified as) a high-mobility wireless communication device 112a. In one configuration, the wireless communication device 112 uses a mobility detector 116 to make this determination. For example, the mobility detector 116 may use an accelerometer and/or Global Positioning System (GPS) locations over time to determine or estimate its motion (e.g., speed). For instance, if the detected speed is less than a threshold rate (e.g., 120 km/h), then the wireless communication device 112 determines that it is not a high-mobility wireless communication device 112a. However, if the detected speed is greater than or equal to the threshold rate (e.g., 250 km/h), then the wireless communication device 112 determines that it is a high-mobility wireless communication device 112a.

If the wireless communication device 112 determines 402 that it is not high-mobility, it 112 uses 404 other signaling. For example, the wireless communication device 112 receives and uses 404 CRS and/or baseline specific reference signals to generate feedback. In this case, no additional specific reference signals may be received or used.

If the wireless communication device 112 determines 402 that it is high-mobility 112a, it may send 406 a high-mobility indicator to the base station 102. For example, the high-mobility wireless communication device 112a generates and sends 406 a speed measurement, high-mobility service request or some other high-mobility indicator to the base station 102. This high-mobility indicator informs the base station 102 that the wireless communication device is high-mobility (e.g., moving at a relatively "high" rate of speed). Thus, the wireless communication device 112 may be identified as a high-mobility wireless communication device 112a.

The (high-mobility) wireless communication device 112a receives 408 a reference signal configuration. For example, the high-mobility wireless communication device 112a receives 408 and interprets the reference signal configuration. In one configuration, this is accomplished using a reference signal configuration interpretation block/module 120. For instance, the high-mobility wireless communication device 112a may receive 408 and interpret the reference signal configuration using a layer-3 limited rank signaling interpretation, an explicit layer-3 signaling interpretation and/or a PDCCH signaling interpretation. In one configuration, where the base station 102 selects one or more of the three foregoing kinds of signaling, the high-mobility wireless communication device 112a also receives an (explicit or implicit) indicator that indicates which kind of signaling is used for the reference signal configuration. The reference signal configuration may indicate whether additional specific reference signal(s) are used and their location (in time and frequency, according to REs, etc.).

The high-mobility wireless communication device 112a may receive 410 an additional specific reference signal. For example, one or more additional specific reference signals are received 410. The additional specific reference signals may be received according to the reference signal configuration. More specifically, the reference signal configuration indicates which communication resources are used to transmit (and receive) the additional specific reference signal(s).

The high-mobility wireless communication device 112a may process 412 the additional specific reference signal. This may be accomplished based on the reference signal configuration. For example, one or more additional specific reference signals corresponding to the communication resources specified by the reference signal configuration are processed by the high-mobility wireless communication device 112a. Processing 412 the additional specific reference signal(s) (e.g., UE-RS) may comprise generating feedback based on the additional specific reference signal(s). In one configuration, this is done using an additional reference signal processing block/module 118. For instance, the high-mobility wireless communication device 112a uses the additional specific reference signal(s) to generate one or more of a Channel Quality Indicator (CQI), Precoding Matrix Indicator (PMI) and Rank Indicator (RI).

The high-mobility wireless communication device 112a may send 414 information to the base station 102 based on the additional specific reference signal (e.g., UE-RS). In one configuration, the high-mobility wireless communication device 112a sends 414 one or more of a Channel Quality Indicator (CQI), Precoding Matrix Indicator (PMI) and Rank Indicator (RI) that was/were generated based on the additional specific reference signal. The base station 102 may use this information to control or improve communications with the high-mobility wireless communication device 112a.

FIG. 5 is a diagram illustrating one example of a subframe 507 without additional specific reference signals. In general, a subframe may be used to communicate information between a base station and a wireless communication device. A subframe comprises a number of frequencies and time periods that represent communication resources used to communicate information. For example, the vertical (frequency) axis 509 illustrates a number of frequencies or tones and the horizontal (time) axis 511 illustrates a number of time periods in FIG. 5. Each block of frequency and time may be referred to as a Resource Element (RE). The subframe 507 illustrated in FIG. 5 may be one example of a subframe 507 in accordance with 3GPP specifications.

In the configuration illustrated in FIG. 5, the subframe 507 includes 12 frequencies or tones (numbered with a tone index, for example) along the frequency axis 509 and 14 time periods along the time axis 511. That is, 168 REs are illustrated. A number of REs are used or allocated for CRS 513 and a number of REs are used or allocated for baseline specific reference signals (e.g., baseline UE-RS) 515. For example, REs may be occupied by CRS 513 in the first, second, fifth, eighth, ninth and twelfth (from the left) time periods for each of the first, fourth, seventh and tenth (from the bottom) tones. CRS 513 may be used by any User Equipments (UEs) 212. However, specific reference signals may be intended for or assigned specifically to one or more particular UEs. In FIG. 5, baseline specific reference signals 515 occupy the sixth, seventh, thirteenth and fourteenth time periods for each of the second, seventh and twelfth tones. The term "baseline" specific reference signal is used to denote specific reference signals that are used for specific UEs when the systems and methods disclosed herein are not used. For example, baseline UE-RS 515 may be specific reference signals used in accordance with current and/or prior 3GPP specifications when the systems and methods disclosed herein are not used. As discussed above, using only the baseline UE-RS 515 for a high-mobility UE may result in degraded communications. This may be because the baseline UE-RS 515 may be used resting on the assumption that UEs are only moving at a nominal rate (e.g., walking speed, typical driving speeds, etc.).

FIG. 6 is a diagram illustrating a subframe 607 with additional specific reference signals. In this example, the subframe 607 has 12 frequencies or tones along the frequency axis 609 and 14 time periods along the time axis 611, which results in 168 REs, similar to the example illustrated in FIG. 5. Similar to the example illustrated in FIG. 5, the subframe 607 illustrated in FIG. 6 includes 24 REs dedicated to CRS 613 and 12 REs dedicated to baseline UE-RS 615. However, in the example illustrated in FIG. 6, six REs are dedicated to additional specific reference signals (UE-RS) 617. These are located in the tenth and eleventh time periods for each of the second, seventh and twelfth tones. FIG. 6 gives one example of a subframe 607 that may be used for reference signaling when a UE is a high-mobility UE (e.g., a UE traveling at a relatively high rate of speed such as 250 km/hr or faster). As illustrated, additional UE-RS 617 are placed in the subframe 607, thus resulting in greater time density of specific reference signals 615, 617 as compared to the subframe 507 illustrated in FIG. 5, where only baseline specific reference signals (UE-RS) are used. Using additional UE-RS may enable improved communications between a Node B and a high-mobility UE (by increasing the rate of feedback, for example). Although an example is given in FIG. 6, many other patterns of CRS 613, baseline UE-RS 615 and/or additional UE-RS 617 may be used.

Figure 7:
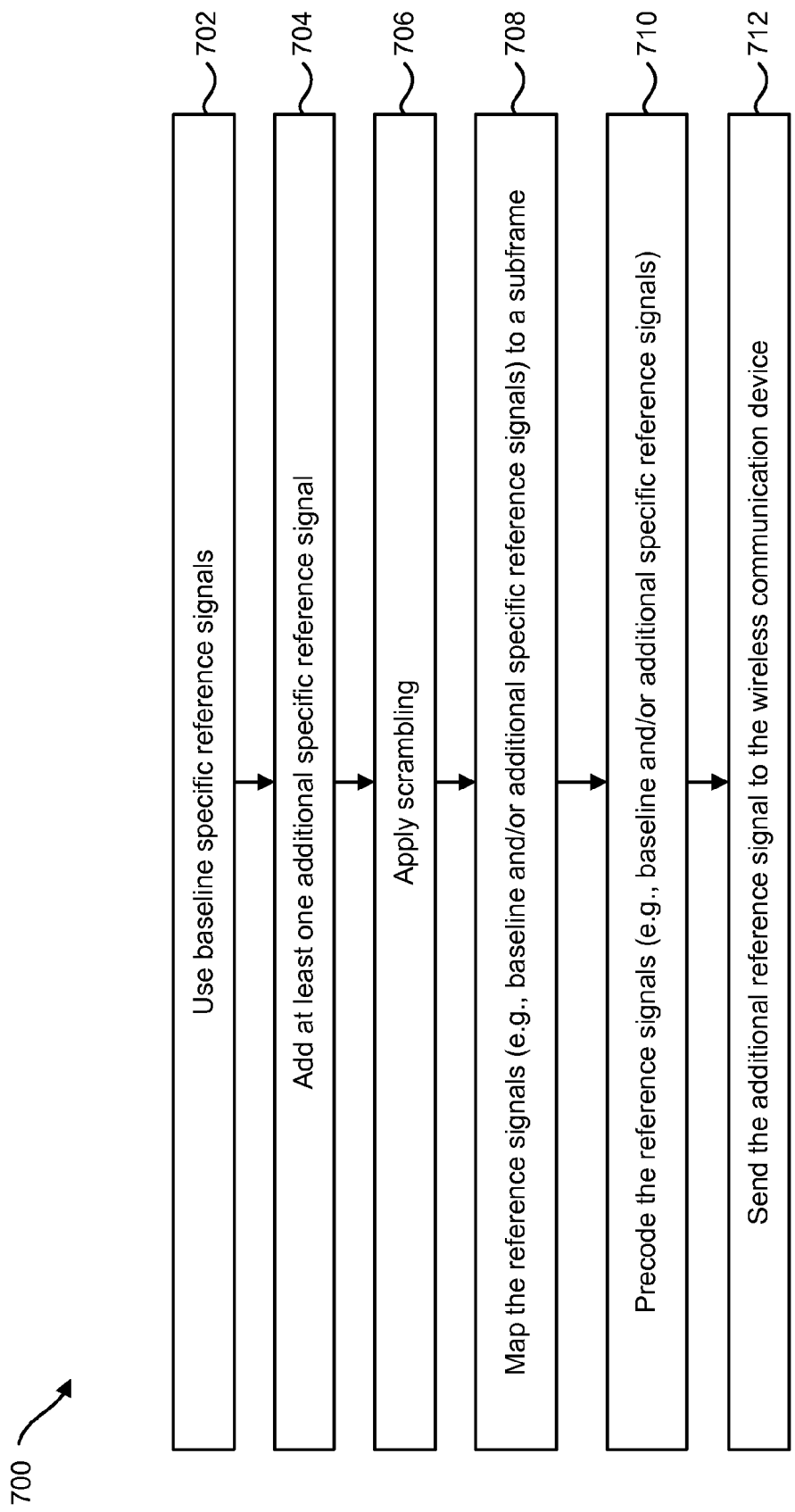
FIG. 7 is a flow diagram illustrating one configuration of a method for allocating additional specific reference signals for a high-mobility wireless communication device.

FIG. 7 is a flow diagram illustrating one configuration of a method 700 for allocating additional specific reference signals for a high-mobility wireless communication device 112a. The method 700 illustrated in FIG. 7 may provide higher density reference signal patterns for high-mobility wireless communication devices 112a (e.g., UE 212). For example, additional UE-RS ports may be used such that an improved UE-RS pattern (e.g., baseline with additional) may be realized to support high-mobility UEs 212. High-mobility wireless communication devices 112a may not typically support higher rank transmissions. For example, a high-mobility UE 212 may typically have r=1, where r denotes (transmission) rank. One or more additional specific reference signals (e.g., UE-RS) may be added to a pattern with one or more baseline reference signals as follows.

A base station 102 (e.g., Node B 202) may use 702 baseline specific reference signals. For example, for a certain rank r transmission, the same Release-8, Release-9 and/or LTE-A UE-RS ports (denoted "baseline UE-RS") are applied. The base station 102 may add 704 at least one additional specific reference signal to a reference signal pattern or subframe. It should be noted that the wireless communication device 112 is informed that additional specific reference signal ports (e.g., additional UE-RS) are also present. The additional specific reference signal ports may be present (or added) in symbols that do not include the baseline specific reference signals. In one configuration, one or more additional specific reference signals (ports) (e.g., additional UE-RS) may be added to element(s) (e.g., RE(s)) (originally) used for baseline specific reference signal(s) (e.g., baseline UE-RS). In some configurations, the additional reference signal ports may use some of the resource elements (e.g., REs) originally used for common reference signals (in the baseline case, for example). As used herein, the phrase "baseline case" may refer to a case in accordance with current and/or prior 3GPP specifications. For example, a baseline case may include particular UE-RS patterns as defined in 3GPP Release-8, Release-9 and/or LTE-A.

The base station 102 (e.g., Node B 202) may apply 706 scrambling. In one configuration, the same scrambling sequence and resource element mapping mechanism that is applied in the baseline specific reference signal case may be similarly applied to the additional reference signal as well. For example, the baseline UE-RS pattern may be used 702 as discussed above. The additional UE-RS pattern may use the same procedure for generation as the baseline UE-RS pattern. However, the additional specific reference signal pattern may not necessarily use the same scrambling sequence. In another configuration, for example, a different scrambling sequence may be used.

The base station 102 (e.g., Node B 202) may map (or apply a mapping to) 708 the reference signals (e.g., baseline UE-RS and/or additional UE-RS) to a subframe. This mapping may be the same mapping as in a baseline specific reference signal case. Alternatively, it may be a different mapping. In one configuration, for example, the UE-RS sequence-to-Resource Element (RE) mapping may follow frequency first and then time. In another configuration, UE-RS-to-RE mapping may follow time first and then frequency, for example.

Data transmission rate-matching around the additional specific reference signal pattern may be used. For example, when a PDSCH is mapped to the REs, it may only be mapped to those REs not occupied by the baseline UE-RS ports and the additional UE-RS ports. Alternatively, data transmission may be punctured in locations with the additional reference signals (e.g., similar to the handling of PDSCH overlapped with Primary Synchronization Signals (PSS) and Secondary Synchronization Signals (SSS) occupying the center six Resource Blocks (RBs) in certain subframes as in 3GPP Release-8). For example, a PDSCH may be first mapped to the REs that are not occupied by the baseline UE-RS ports only, followed by PDSCH REs colliding with the additional UE-RS REs being punctured. Different wireless communication devices 112 (e.g., UEs 212) may be informed using the same additional specific reference signal ports or different additional specific reference signal ports (depending on the wireless communication device 112 speed, for example).

The base station 102 (e.g., Node B 202) may precode 710 the reference signals (e.g., baseline UE-RS and/or additional UE-RS). The same precoding may be applied to the additional specific reference signal that is applied to the baseline specific reference signal. The base station 102 (e.g., Node B 202) may send 712 the additional specific reference signal to the (high-mobility) wireless communication device 112a (e.g., UE 212).

Figure 8:
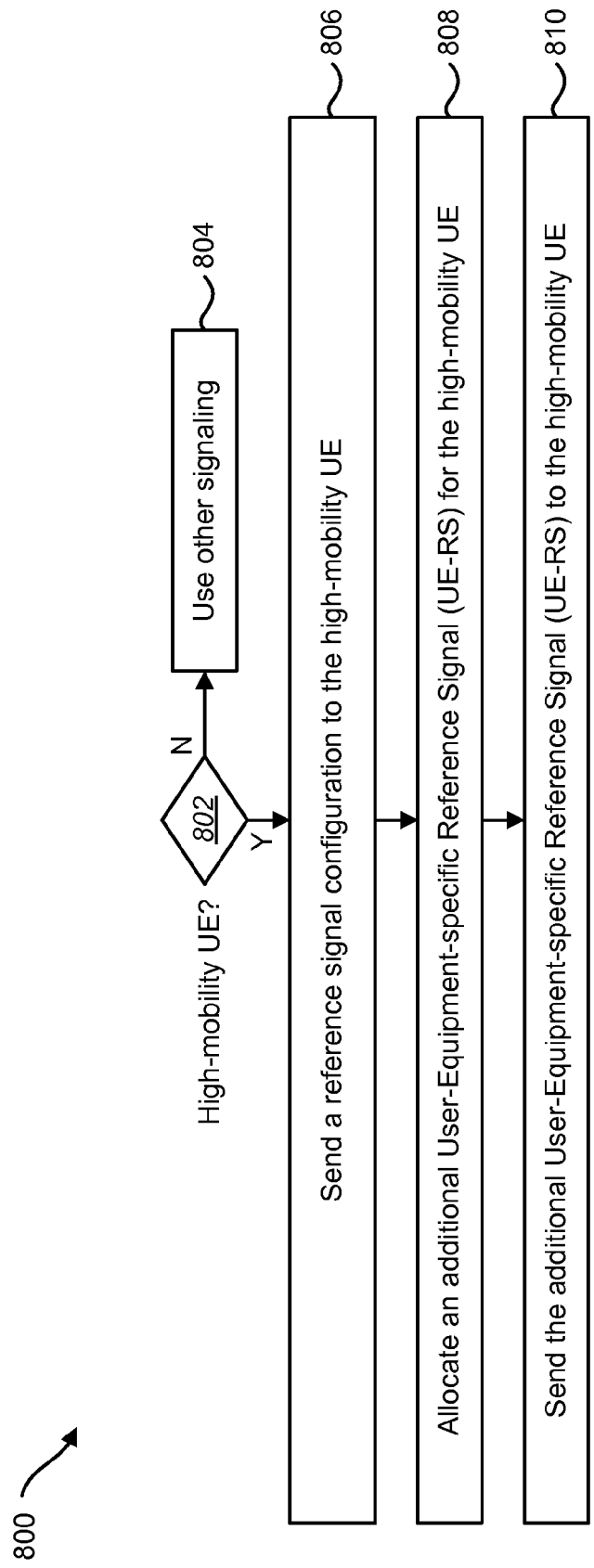
FIG. 8 is a flow diagram illustrating a more specific configuration of a method for reference signaling for a high-mobility wireless communication device.

FIG. 8 is a flow diagram illustrating a more specific configuration of a method 800 for reference signaling for a high-mobility wireless communication device. A Node B 202 may identify 802 a high-mobility UE 212. For example, the Node B 202 may identify 802 a high-mobility UE 212 by receiving a high-mobility indicator (e.g., a speed measurement that meets or exceeds a high-mobility threshold, a high-mobility service request or some other indicator, etc.) from a high-mobility UE 212. If the Node B 202 does not identify a high-mobility UE 212 (e.g., the one or more UEs 112 that it 202 is communicating with are not high-mobility), then the Node B 202 may use 804 other signaling. For example, the Node B 202 may use CRS and/or baseline UE-RS for the UEs 212.

If the Node B 202 identifies a high-mobility UE 212 (e.g., receives a high-mobility indicator), then the Node B 202 may send 806 a reference signal configuration to the high-mobility UE 212. For example, the Node B 202 may generate and send 806 this reference signal configuration using a reference signal configuration signaling block/module 208. This may be done using layer-3 limited rank signaling 228, explicit layer-3 signaling 230 and/or (explicit or implicit) PDCCH signaling 232, for instance. This reference signal configuration may indicate to the high-mobility UE 212 whether additional (besides any baseline UE-RS) are being used and their location (e.g., in time and frequency and/or according to Resource Element (RE)).

The Node B 202 may allocate 808 an additional UE-RS for the high-mobility UE 212. For example, the Node B 202 generates one or more additional UE-RS and allocates communication resources (e.g., time and frequency resources, REs, etc.) for their transmission. This may be done using a reference signal allocation for high-mobility UEs block/module 206. For example, the Node B 202 allocates six additional REs for the transmission of six additional UE-RS as illustrated in FIG. 6. In one configuration, the additional UE-RS may be transmitted using REs that are not used by CRS or baseline UE-RS. In another configuration, one or more of the additional UE-RS may be transmitted using REs that were originally allocated for CRS. In another configuration, one or more of the additional UE-RS may be transmitted using REs that were originally allocated for baseline UE-RS. In yet another configuration, one or more of the additional UE-RS may be transmitted using REs that were originally allocated for CRS and baseline UE-RS. Allocating additional UE-RS may increase the time density of reference signals, enabling more frequent feedback and thus, improved communications between the Node B 202 and the high-mobility UE 212.

The Node B 202 may send 810 the one or more additional UE-RS to the high-mobility UE 212. For example, the Node B 202 may transmit the additional UE-RS using one or more transmitters 264 and one or more antennas 210a-n.

Figure 9:
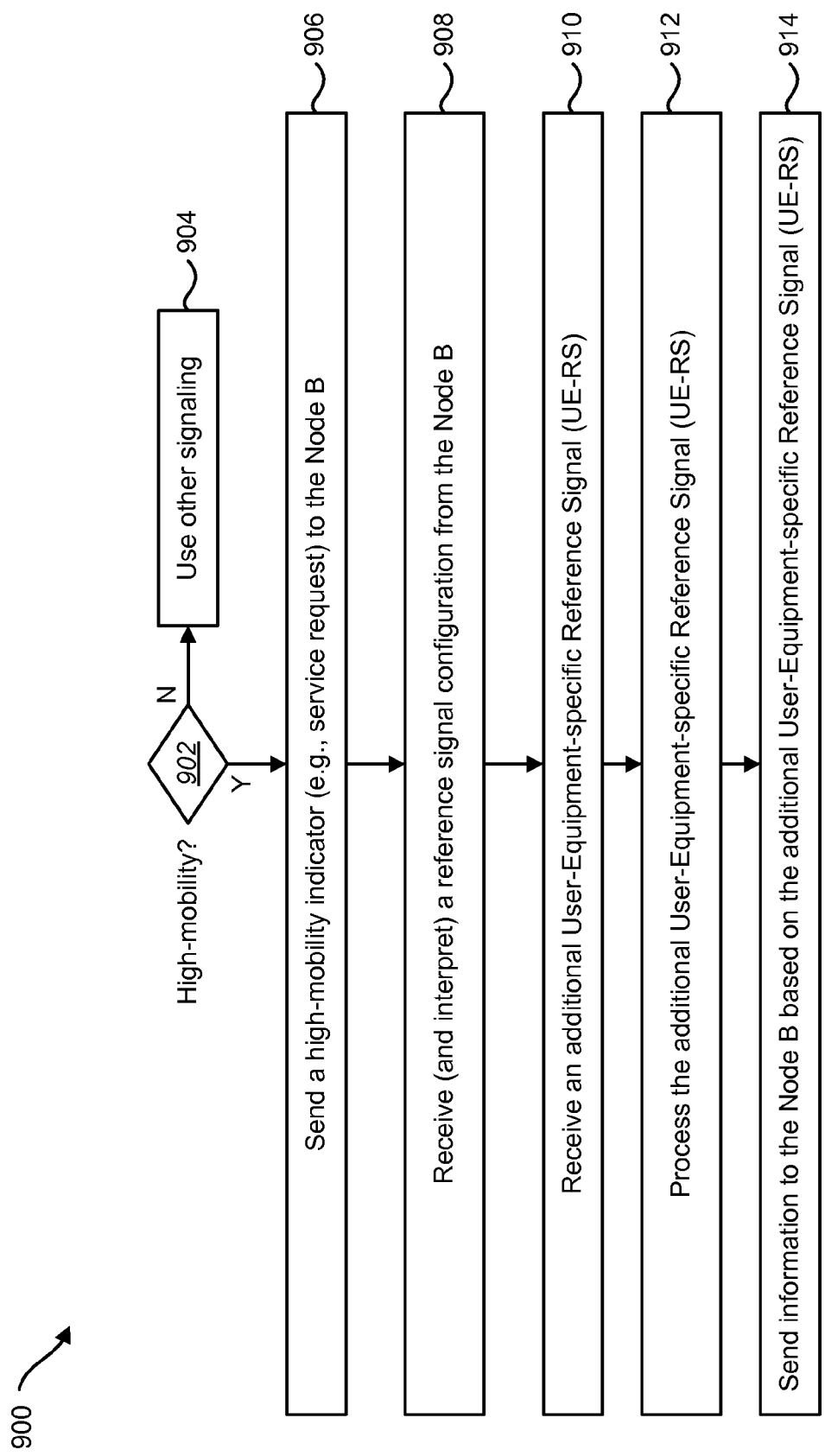
FIG. 9 is a flow diagram illustrating one configuration of a method for utilizing reference signaling for a high-mobility wireless communication device.

FIG. 9 is a flow diagram illustrating one configuration of a method 900 for utilizing reference signaling for a high-mobility wireless communication device. A UE 212 (e.g., wireless communication device) may determine 902 whether it is (e.g., can be classified as) a high-mobility UE 212. In one configuration, the UE 212 uses a mobility detector 216 to make this determination 902. For example, the mobility detector 216 may use an accelerometer 278 and/or Global Positioning System (GPS) 280 locations over time to determine or estimate its motion (e.g., speed). For instance, if the detected speed is less than a threshold rate (e.g., 250 km/h), then the UE 212 determines 902 that it is not a high-mobility UE 212. However, if the detected speed is greater than or equal to the threshold rate (e.g., 250 km/h), then the UE 212 determines 902 that it is (or is classified as) a high-mobility UE 212.

If the UE 212 determines 902 that it is not high-mobility, it 212 uses 904 other signaling. For example, the UE 212 receives and uses 904 CRS and/or baseline UE-RS to generate feedback. In this case, no additional UE-RS may be received or used.

If the UE 212 determines 902 that it is high-mobility, it 212 may send 906 a high-mobility indicator to the Node B 202. For example, the high-mobility UE 212 generates and sends 906 a speed measurement, high-mobility service request or some other high-mobility indicator to the Node B 202. This high-mobility indicator informs the Node B 202 that the UE 212 is high-mobility (e.g., moving at a relatively "high" rate of speed). Thus, the UE 212 may be identified as a high-mobility UE 212.

The (high-mobility) UE 212 receives 908 a reference signal configuration from the Node B 202. For example, the high-mobility UE 212 receives 908 and interprets the reference signal configuration. In one configuration, this is accomplished using a reference signal configuration interpretation block/module 220. For instance, the high-mobility UE 212 may receive 908 and interpret the reference signal configuration using a layer-3 limited rank signaling interpretation 294, an explicit layer-3 signaling interpretation 296 and/or a PDCCH signaling interpretation 298. In one configuration, where the Node B 202 selects one or more of the three foregoing kinds of signaling, the high-mobility UE 212 also receives an (explicit or implicit) indicator that indicates which kind of signaling is used for the reference signal configuration. The reference signal configuration may indicate whether one or more additional UE-RS are used and their location (in time and frequency, according to REs, etc.).

The high-mobility UE 212 may receive 910 an additional UE-RS. For example, one or more additional UE-RS are received 910. The additional UE-RS may be received according to the reference signal configuration. More specifically, the reference signal configuration indicates which communication resources are used to transmit (and receive) the additional UE-RS.

The high-mobility UE 212 may process 912 the additional UE-RS. This may be done based on the reference signal configuration. For example, one or more additional UE-RS corresponding to the communication resources specified by the reference signal configuration are processed by the high-mobility UE 212. Processing 912 the additional UE-RS may comprise generating feedback based on the additional specific reference signal(s). In one configuration, this is done using an additional reference signal processing block/module 218. For instance, the high-mobility UE 212 uses the additional UE-RS to generate one or more of a Channel Quality Indicator (CQI), Precoding Matrix Indicator (PMI) and Rank Indicator (RI).

The high-mobility UE 212 may send 914 information to the Node B 202 based on the additional UE-RS. In one configuration, the high-mobility UE 212 sends 914 one or more of a Channel Quality Indicator (CQI), Precoding Matrix Indicator (PMI) and Rank Indicator (RI) that was/were generated based on the additional UE-RS. The Node B 202 may use this information to control or improve communications with the high-mobility UE 212.

FIG. 10 is a diagram illustrating another example of a subframe 1007. More specifically, FIG. 10 illustrates one example of signaling used to indicate a reference signal configuration for additional UE-RS in a non-Multimedia Broadcast over a Single Frequency Network (non-MBSFN) subframe 1007. In general, a subframe comprises a number of frequencies and time periods that represent communication resources used to communicate information. For example, the vertical (frequency) axis 1009 illustrates a number of frequencies or tones and the horizontal (time) axis 1011 illustrates a number of time periods in FIG. 10. Each block of frequency and time may be referred to as a Resource Element (RE).

In the configuration illustrated in FIG. 10, the (non-MBSFN) subframe 1007 includes 12 frequencies or tones (numbered with a tone index, for example) along the frequency axis 1009 and 14 time periods along the time axis 1011. That is, 168 REs are illustrated. A number of REs are used or allocated for CRS 1013 and a number of REs are used or allocated for baseline UE-RS 1015 (similar to the example illustrated in FIG. 5). CRS 1013 may be used by any User Equipments (UEs) serviced by the Node B 202. However, UE-RS 1015, 1017 may be intended for or assigned specifically to one or more particular UEs. The term "baseline" UE-RS is used to denote specific reference signals that are used for specific UEs when the systems and methods disclosed herein are not used. For example, baseline UE-RS 1015 may be specific reference signals used in accordance with current and/or prior 3GPP specifications when the systems and methods disclosed herein are not used. As discussed above, using only the baseline UE-RS 1015 for a high-mobility UE may result in degraded communications. This may be because the baseline UE-RS 1015 may be used resting on the assumption that UEs are only moving at a nominal rate (e.g., walking speed, typical driving speeds, etc.).

In the example illustrated in FIG. 10, however, additional UE-RS 1017 are used in a non-Multimedia Broadcast over a Single Frequency Network subframe (non-MBSFN) 1007. Reference signal configuration (indicators) 10 1019 and 01 1021 are also illustrated in this example. For instance, the two-bit indicator 10 1019 may indicate that additional UE-RS of six REs are used in one subframe. Thus, additional UE-RS 1017 occupies the fourth and tenth time periods or symbols (from the left) for the second, seventh and twelfth tones (from the bottom). It should be noted that the tone index corresponding to the frequency axis 1009 may be 0-based in some configurations. Thus, the additional UE-RS may be placed on tones at indexes 1, 6 and 11, for example.

Additionally or alternatively, the two-bit indicator 01 1021 may indicate that additional UE-RS of three REs are used in one subframe (in time 1011). Thus, this indicator 1021 may indicate that additional UE-RS of three REs are used in the tenth time period or symbols for the second, seventh and twelfth tones (at indexes 1, 6 and 11, for example).

The indicators 1019, 1021 illustrated as examples in FIG. 10 may be explicitly or implicitly signaled according to the systems and methods disclosed herein. For example, the two-bit indicators 1019, 1021 may be explicitly signaled using explicit layer-3 signaling or explicit PDCCH signaling. Alternatively, the two-bit indicators 1019, 1021 may be implicitly signaled using implicit PDCCH signaling, for example. For instance, when S–R=1, this may imply a 01 indicator 1021 or that additional UE-RS of three REs are used. Furthermore, when S–R≥2, this may imply a 10 indicator 1019 or that additional UE-RS of six REs are used.

FIG. 11 is a diagram illustrating another example of a subframe 1107. More specifically, FIG. 11 illustrates one example of signaling used to indicate a reference signal configuration for additional UE-RS in a Multimedia Broadcast over a Single Frequency Network (MBSFN) subframe 1107. The vertical (frequency) axis 1109 illustrates a number of frequencies or tones and the horizontal (time) axis 1111 illustrates a number of time periods in FIG. 11. Each block of frequency and time may be referred to as a Resource Element (RE).

In the configuration illustrated in FIG. 11, the (MBSFN) subframe 1107 includes 12 frequencies or tones (numbered with a tone index, for example) along the frequency axis 1109 and 14 time periods along the time axis 1111. That is, 168 REs are illustrated. A number of REs (e.g., eight—in the first two time periods for each of the first, fourth, seventh and tenth tones) are used or allocated for CRS 1113 and a number of REs (e.g., 12) are used or allocated for baseline UE-RS 1115 (similar to the example illustrated in FIG. 10). CRS 1113 may be used by any User Equipments (UEs) 212 serviced by the Node B 202. However, UE-RS 1115, 1117 may be intended for or assigned specifically to one or more particular UEs. For example, baseline UE-RS 1115 may be specific reference signals used in accordance with current and prior 3GPP specifications when the systems and methods disclosed herein are not used.

In the example illustrated in FIG. 11, additional UE-RS 1117 are used in a Multimedia Broadcast over a Single Frequency Network (MBSFN) subframe 1107. Reference signal configuration (indicators) 10 1119 and 01 1121 are also illustrated in this example. For instance, the two-bit indicator 10 1119 may indicate that additional UE-RS 1117 of six REs are used. Thus, an additional UE-RS 1117 occupies the fourth and tenth time periods (from the left) for the second, seventh and twelfth tones (from the bottom). It should be noted that the tone index corresponding to the frequency axis 1109 may be 0-based in some configurations. Thus, the additional UE-RS may be placed on tones at indexes 1, 6 and 11, for example.

Additionally or alternatively, the two-bit indicator 01 1121 may indicate that additional UE-RS 1117 of three REs are used in one subframe. Thus, this indicator 1121 may indicate that additional UE-RS 1117 are used in the tenth time period for the second, seventh and twelfth tones (at indexes 1, 6 and 11, for example).

The indicators 1119, 1121 illustrated as examples in FIG. 11 may be explicitly or implicitly signaled according to the systems and methods disclosed herein. For example, the two-bit indicators 1119, 1121 may be explicitly signaled using explicit layer-3 signaling or explicit PDCCH signaling. Alternatively, the two-bit indicators 1119, 1121 may be implicitly signaled using implicit PDCCH signaling, for example. For instance, when S–R=1, this may imply a 01 indicator 1121 or that additional UE-RS of three REs are used. Furthermore, when S−R≥2, this may imply a 10 indicator 1119 or that additional UE-RS of six REs are used.

In some configurations, signaling may also be used to distinguish between a non-Multimedia Broadcast over a Single Frequency Network (MBSFN) subframe and a Multimedia Broadcast over a Single Frequency Network (MBSFN) subframe. For example, signaling may be used to distinguish between the subframe 1007 illustrated in FIG. 10 and the subframe 1107 illustrated in FIG. 11. For example, a two-bit indicator 00 may indicate that for MBSFN subframes, no additional UE-RS are used, while for non-MBSFN subframes, no additional UE-RS are used, but CRS are used for additional reference signals for the UE.

Figure 12:
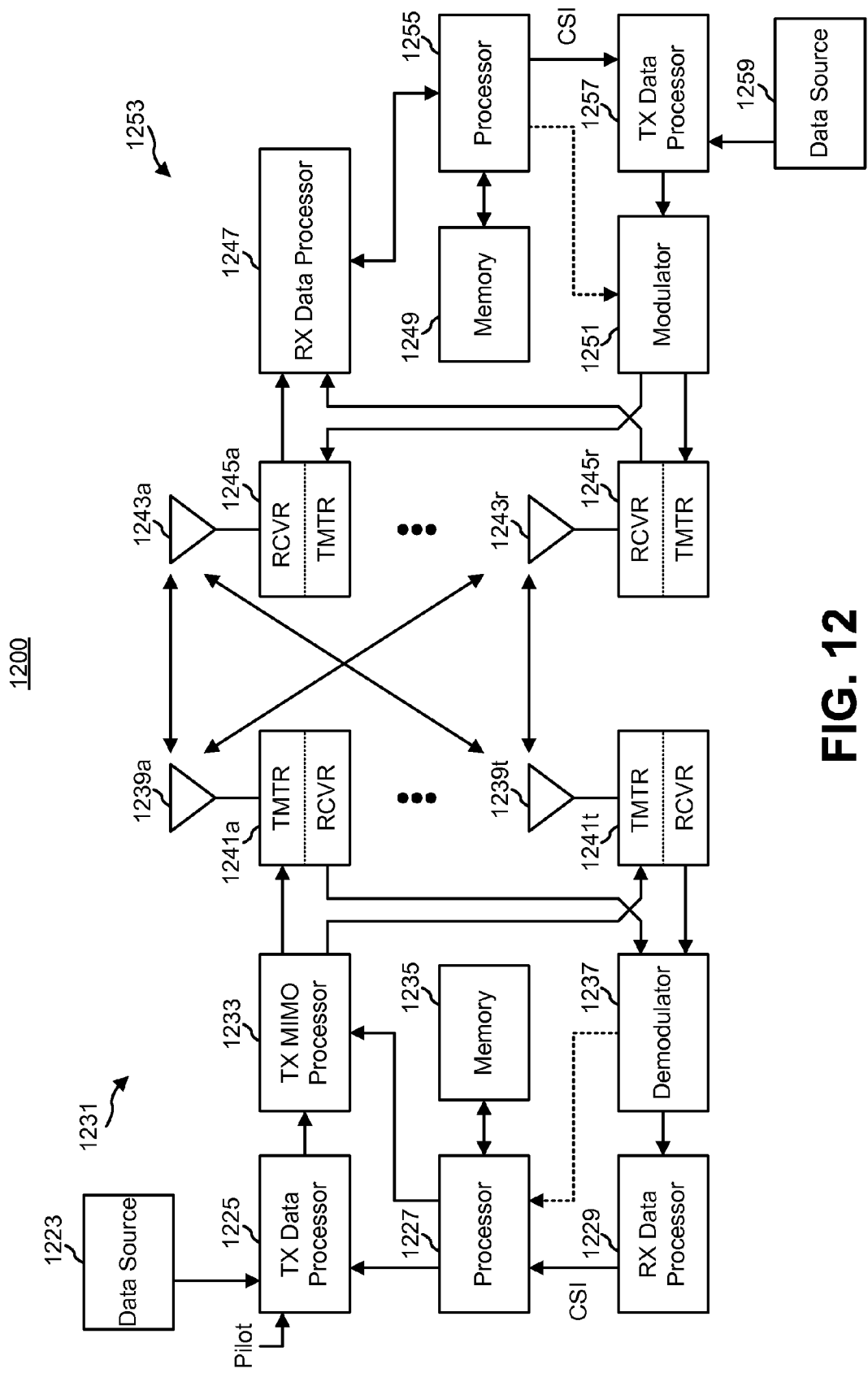
FIG. 12 is a block diagram of a transmitter and receiver in a multiple-input and multiple-output (MIMO) system.

FIG. 12 is a block diagram of a transmitter 1231 and receiver 1253 in a multiple-input and multiple-output (MIMO) system 1200. In the transmitter 1231, traffic data for a number of data streams is provided from a data source 1223 to a transmit (TX) data processor 1225. Each data stream may then be transmitted over a respective transmit antenna 1239a-t. The transmit (TX) data processor 1225 may format, code, and interleave the traffic data for each data stream based on a particular coding scheme selected for that data stream to provide coded data.

The coded data for each data stream may be multiplexed with pilot data (e.g., reference signals) using orthogonal frequency-division multiplexing (OFDM) techniques. The pilot data may be a known data pattern that is processed in a known manner and used at the receiver 1253 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 1233, which may further process the modulation symbols (e.g., for OFDM). The transmit (TX) multiple-input multiple-output (MIMO) processor 1233 then provides NT modulation symbol streams to NT transmitters (TMTR) 1241a through 1241t. The TX transmit (TX) multiple-input multiple-output (MIMO) processor 1233 may apply beamforming weights to the symbols of the data streams and to the antenna 1239 from which the symbol is being transmitted.

Each transmitter 1241 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1241a through 1241t are then transmitted from NT antennas 1239a through 1239t, respectively.

At the receiver 1253, the transmitted modulated signals are received by NR antennas 1243a through 1243r and the received signal from each antenna 1243 is provided to a respective receiver (RCVR) 1245a through 1245r. Each receiver 1245 may condition (e.g., filter, amplify, and downconvert) a respective received signal, digitize the conditioned signal to provide samples, and further process the samples to provide a corresponding "received" symbol stream.

An RX data processor 1247 then receives and processes the NR received symbol streams from NR receivers 1245 based on a particular receiver processing technique to provide NT "detected" symbol streams. The RX data processor 1247 then demodulates, deinterleaves and decodes each detected symbol stream to recover the traffic data for the data stream. The processing by RX data processor 1247 may be complementary to that performed by TX MIMO processor 1233 and TX data processor 1225 at transmitter system 1231.

A processor 1255 may periodically determine which precoding matrix to use. The processor 1255 may store information on and retrieve information from memory 1249. The processor 1255 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1257, which also receives traffic data for a number of data streams from a data source 1259, modulated by a modulator 1251, conditioned by transmitters 1245a through 1245r, and transmitted back to the transmitter 1231.

At the transmitter 1231, the modulated signals from the receiver are received by antennas 1239, conditioned by receivers 1241, demodulated by a demodulator 1237, and processed by an RX data processor 1229 to extract the reverse link message transmitted by the receiver system 1253. A processor 1227 may receive channel state information (CSI) from the RX data processor 1229. The processor 1227 may store information on and retrieve information from memory 1235. The processor 1227 then determines which pre-coding matrix to use for determining the beamforming weights and then processes the extracted message. The base station 102 and Node B 202 discussed above may be configured similarly to the transmitter 1231 illustrated in FIG. 12. The one or more wireless communication devices 112 and the one or more UEs 212 discussed above may be configured similarly to the receiver 1253 illustrated in FIG. 12.

Figure 13:
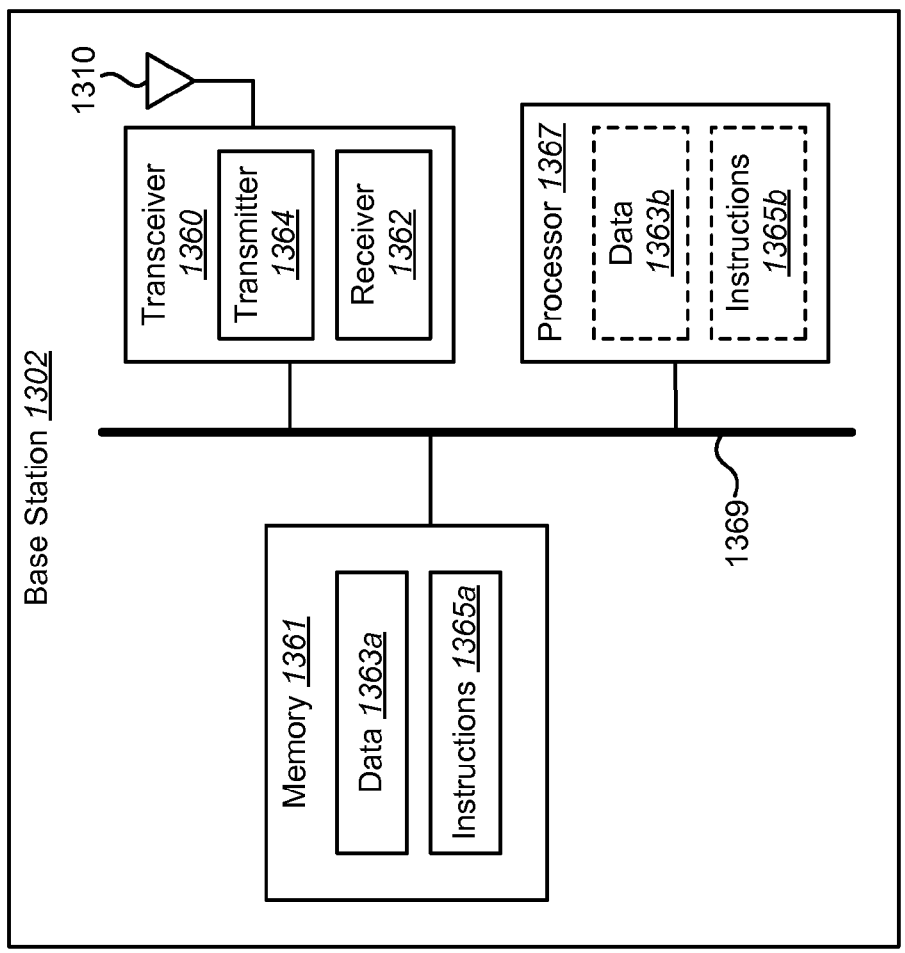
FIG. 13 illustrates certain components that may be included within a base station.

FIG. 13 illustrates certain components that may be included within a base station 1302. The base station 102 and Node B 202 discussed previously may be configured similarly to the base station 1302 shown in FIG. 13. The base station 1302 includes a processor 1367. The processor 1367 may be a general purpose single- or multi-chip microprocessor (e.g., an ARM), a special purpose microprocessor (e.g., a digital signal processor (DSP)), a microcontroller, a programmable gate array, etc. The processor 1367 may be referred to as a central processing unit (CPU). Although just a single processor 1367 is shown in the base station 1302 of FIG. 13, in an alternative configuration, a combination of processors (e.g., an ARM and DSP) could be used.

The base station 1302 also includes memory 1361 in electronic communication with the processor 1367 (i.e., the processor 1367 can read information from and/or write information to the memory 1361). The memory 1361 may be any electronic component capable of storing electronic information. The memory 1361 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1363a and instructions 1365a may be stored in the memory 1361. The instructions 1365a may include one or more programs, routines, sub-routines, functions, procedures, etc. The instructions 1365a may include a single computer-readable statement or many computer-readable statements. The instructions 1365a may be executable by the processor 1367. Executing the instructions 1365a may involve the use of the data 1363a that is stored in the memory 1361. FIG. 13 shows some instructions 1365b and data 1363b being loaded into the processor 1367.

The base station 1302 may also include a transmitter 1364 and a receiver 1362 to allow transmission and reception of signals between the base station 1302 and a remote location (e.g., a wireless communication device or other device). The transmitter 1364 and receiver 1362 may be collectively referred to as a transceiver 1360. An antenna 1310 may be electrically coupled to the transceiver 1360. The base station 1302 may also include (not shown) multiple transmitters, multiple receivers, multiple transceivers and/or multiple antenna.

The various components of the base station 1302 may be coupled together by one or more buses, which may include a power bus, a control signal bus, a status signal bus, a data bus, etc. For simplicity, the various buses are illustrated in FIG. 13 as a bus system 1369.

Figure 14:
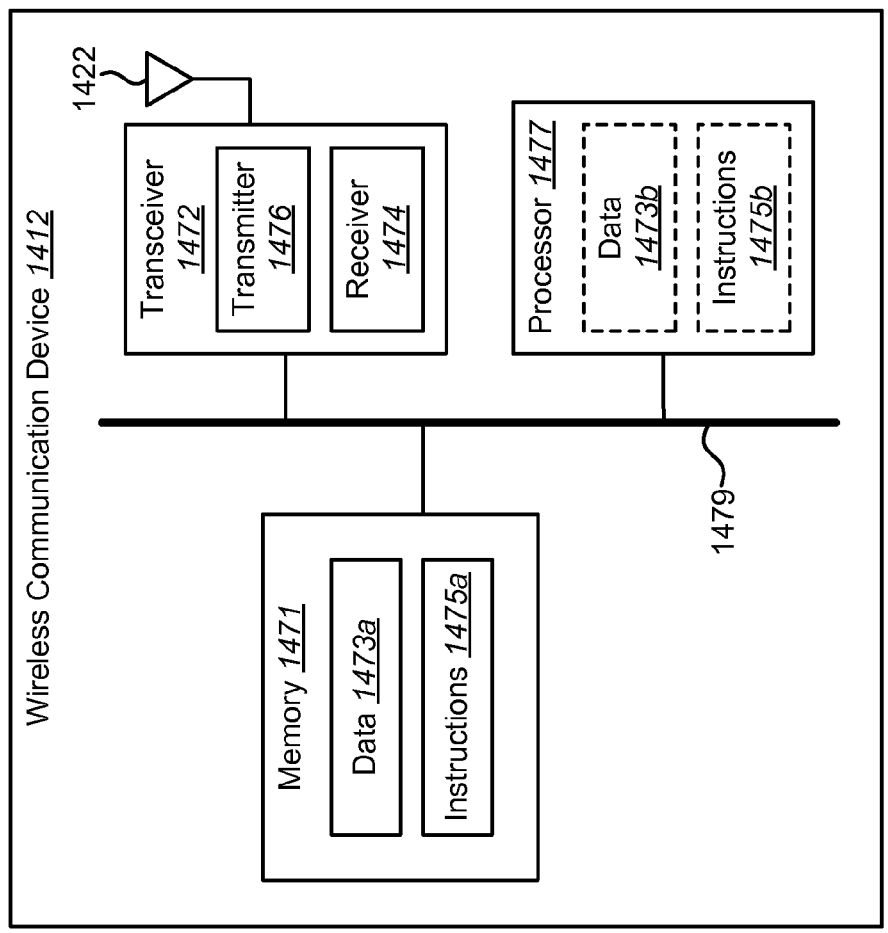
FIG. 14 illustrates certain components that may be included within a wireless communication device.

FIG. 14 illustrates certain components that may be included within a wireless communication device 1412. The one or more wireless communication devices 112 and one or more UEs 212 described above may be configured similarly to the wireless communication device 1412 that is shown in FIG. 14. The wireless communication device 1412 includes a processor 1477. The processor 1477 may be a general purpose single- or multi-chip microprocessor (e.g., an ARM), a special purpose microprocessor (e.g., a digital signal processor (DSP)), a microcontroller, a programmable gate array, etc. The processor 1477 may be referred to as a central processing unit (CPU). Although just a single processor 1477 is shown in the wireless communication device 1412 of FIG. 14, in an alternative configuration, a combination of processors (e.g., an ARM and DSP) could be used.

The wireless communication device 1412 also includes memory 1471 in electronic communication with the processor 1477 (i.e., the processor 1477 can read information from and/or write information to the memory 1471). The memory 1471 may be any electronic component capable of storing electronic information. The memory 1471 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1473a and instructions 1475a may be stored in the memory 1471. The instructions 1475a may include one or more programs, routines, sub-routines, functions, procedures, etc. The instructions 1475a may include a single computer-readable statement or many computer-readable statements. The instructions 1475a may be executable by the processor 1477 to implement the methods that were described above. Executing the instructions 1475a may involve the use of the data 1473a that is stored in the memory 1471. FIG. 14 shows some instructions 1475b and data 1473b being loaded into the processor 1477.

The wireless communication device 1412 may also include a transmitter 1476 and a receiver 1474 to allow transmission and reception of signals between the wireless communication device 1412 and a remote location (e.g., a base station or other device). The transmitter 1476 and receiver 1474 may be collectively referred to as a transceiver 1472. An antenna 1422 may be electrically coupled to the transceiver 1472. The wireless communication device 1412 may also include (not shown) multiple transmitters, multiple receivers, multiple transceivers and/or multiple antenna.

The various components of the wireless communication device 1412 may be coupled together by one or more buses, which may include a power bus, a control signal bus, a status signal bus, a data bus, etc. For simplicity, the various buses are illustrated in FIG. 14 as a bus system 1479.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A base station for enabling communication with a high-mobility wireless communication device, comprising:
   a processor;
   memory in electronic communication with the processor;
   instructions stored in the memory, the instructions being executable to:
      identify a high-mobility wireless communication device;
      send a reference signal configuration;
      allocate an additional specific reference signal in response to identifying the high-mobility wireless communication device; and
      send the additional specific reference signal to the high-mobility wireless communication device.

2. The base station of claim 1, wherein allocating an additional specific reference signal comprises:
   using a baseline specific reference signal; and
   adding an additional specific reference signal in an element not including the baseline specific reference signal.

3. The base station of claim 1, wherein allocating an additional specific reference signal further comprises adding the additional specific reference signal in an element used for a common reference signal.

4. The base station of claim 1, wherein allocating an additional specific reference signal further comprises adding the additional specific reference signal in an element used for a baseline specific reference signal.

5. The base station of claim 1, wherein allocating an additional specific reference signal comprises applying a same precoding to the additional specific reference signal as is used for a baseline specific reference signal.

6. The base station of claim 1, wherein allocating an additional specific reference signal comprises applying a same scrambling sequence as in a baseline specific reference signal case.

7. The base station of claim 1, wherein allocating an additional specific reference signal comprises applying a different scrambling sequence as in a baseline specific reference signal case.

8. The base station of claim 1, wherein allocating an additional specific reference signal comprises applying a same mapping mechanism as in a baseline specific reference signal case.

9. The base station of claim 1, wherein allocating an additional specific reference signal comprises applying a different mapping mechanism from a baseline specific reference signal case.

10. The base station of claim 1, wherein allocating an additional specific reference signal comprises applying transmission rate matching around the additional specific reference signal.

11. The base station of claim 1, wherein allocating an additional specific reference signal comprises applying puncturing.

12. The base station of claim 1, wherein sending a reference signal configuration comprises sending the reference signal configuration using a layer-3 limited rank transmission.

13. The base station of claim 12, wherein the layer-3 limited rank transmission is separately configured or uses a codebook subset restriction mechanism.

14. The base station of claim 1, wherein sending a reference signal configuration comprises sending the reference signal configuration using explicit layer-3 signaling.

15. The base station of claim 1, wherein sending a reference signal configuration comprises sending the reference signal configuration using explicit Physical Downlink Control Channel (PDCCH) signaling.

16. The base station of claim 1, wherein sending a reference signal configuration comprises sending the reference signal configuration using implicit Physical Downlink Control Channel (PDCCH) signaling.

17. The base station of claim 1, wherein the reference signal configuration distinguishes between Multimedia Broadcast over a Single-Frequency Network (MBSFN) subframes and non-MBSFN subframes.

18. The base station of claim 1, wherein the base station is a Node B.

19. The base station of claim 1, wherein the specific reference signal is a User Equipment-specific Reference Signal (UE-RS).

20. The base station of claim 1, wherein the additional specific reference signal is in addition to a baseline specific reference signal.

21. A wireless communication device for utilizing reference signaling, comprising:
    a processor;
    memory in electronic communication with the processor;
    instructions stored in the memory, the instructions being executable to:
       determine whether the wireless communication device is a high-mobility wireless communication device;
       receive a reference signal configuration;
       receive an additional specific reference signal;
       process the additional specific reference signal; and
       send information based on the additional specific reference signal.

22. The wireless communication device of claim 21, wherein the instructions are further executable to send a high-mobility indicator if the wireless communication device is a high-mobility wireless communication device.

23. The wireless communication device of claim 21, wherein receiving a reference signal configuration comprises receiving the reference signal configuration using a layer-3 limited rank transmission.

24. The wireless communication device of claim 23, wherein the layer-3 limited rank transmission is separately configured or uses a codebook subset restriction mechanism.

25. The wireless communication device of claim 21, wherein receiving a reference signal configuration comprises receiving the reference signal configuration using explicit layer-3 signaling.

26. The wireless communication device of claim 21, wherein receiving a reference signal configuration comprises receiving the reference signal configuration using explicit Physical Downlink Control Channel (PDCCH) signaling.

27. The wireless communication device of claim 21, wherein receiving a reference signal configuration comprises receiving the reference signal configuration using implicit Physical Downlink Control Channel (PDCCH) signaling.

28. The wireless communication device of claim 21, wherein the reference signal configuration distinguishes between Multimedia Broadcast over a Single-Frequency Network (MBSFN) subframes and non-MBSFN subframes.

29. The wireless communication device of claim 21, wherein processing the additional specific reference signal comprises generating feedback based on the additional specific reference signal.

30. The wireless communication device of claim 21, wherein the wireless communication device is a User Equipment (UE).

31. The wireless communication device of claim 21, wherein the specific reference signal is a User Equipment-specific Reference Signal (UE-RS).

32. The wireless communication device of claim 21, wherein the additional specific reference signal is in addition to a baseline specific reference signal.

33. A method for enabling communication with a high-mobility wireless communication device, comprising:
   identifying, by a base station, a high-mobility wireless communication device;
   sending a reference signal configuration;
   allocating, by the base station, an additional specific reference signal in response to identifying the high-mobility wireless communication device; and
   sending, from the base station, the additional specific reference signal to the high-mobility wireless communication device.

34. The method of claim 33, wherein allocating an additional specific reference signal comprises:
   using a baseline specific reference signal; and
   adding an additional specific reference signal in an element not including the baseline specific reference signal.

35. The method of claim 33, wherein allocating an additional specific reference signal further comprises adding the additional specific reference signal in an element used for a common reference signal.

36. The method of claim 33, wherein allocating an additional specific reference signal further comprises adding the additional specific reference signal in an element used for a baseline specific reference signal.

37. The method of claim 33, wherein allocating an additional specific reference signal comprises applying a same precoding to the additional specific reference signal as is used for a baseline specific reference signal.

38. The method of claim 33, wherein allocating an additional specific reference signal comprises applying a same scrambling sequence as in a baseline specific reference signal case.

39. The method of claim 33, wherein allocating an additional specific reference signal comprises applying a different scrambling sequence as in a baseline specific reference signal case.

40. The method of claim 33, wherein allocating an additional specific reference signal comprises applying a same mapping mechanism as in a baseline specific reference signal case.

41. The method of claim 33, wherein allocating an additional specific reference signal comprises applying a different mapping mechanism from a baseline specific reference signal case.

42. The method of claim 33, wherein allocating an additional specific reference signal comprises applying transmission rate matching around the additional specific reference signal.

43. The method of claim 33, wherein allocating an additional specific reference signal comprises applying puncturing.

44. The method of claim 33, wherein sending a reference signal configuration comprises sending the reference signal configuration using a layer-3 limited rank transmission.

45. The method of claim 44, wherein the layer-3 limited rank transmission is separately configured or uses a codebook subset restriction mechanism.

46. The method of claim 33, wherein sending a reference signal configuration comprises sending the reference signal configuration using explicit layer-3 signaling.

47. The method of claim 33, wherein sending a reference signal configuration comprises sending the reference signal configuration using explicit Physical Downlink Control Channel (PDCCH) signaling.

48. The method of claim 33, wherein sending a reference signal configuration comprises sending the reference signal configuration using implicit Physical Downlink Control Channel (PDCCH) signaling.

49. The method of claim 33, wherein the reference signal configuration distinguishes between Multimedia Broadcast over a Single-Frequency Network (MBSFN) subframes and non-MBSFN subframes.

50. The method of claim 33, wherein the base station is a Node B.

51. The method of claim 33, wherein the specific reference signal is a User Equipment-specific Reference Signal (UE-RS).

52. The method of claim 33, wherein the additional specific reference signal is in addition to a baseline specific reference signal.

53. A method for utilizing reference signaling, comprising:
   determining, by a wireless communication device, whether the wireless communication device is a high-mobility wireless communication device;
   receiving a reference signal configuration;
   receiving, on the wireless communication device, an additional specific reference signal;
   processing, on the wireless communication device, the additional specific reference signal; and
   sending information based on the additional specific reference signal.

54. The method of claim 53, further comprising sending a high-mobility indicator if the wireless communication device is a high-mobility wireless communication device.

55. The method of claim 53, wherein receiving a reference signal configuration comprises receiving the reference signal configuration using a layer-3 limited rank transmission.

56. The method of claim 55, wherein the layer-3 limited rank transmission is separately configured or uses a codebook subset restriction mechanism.

57. The method of claim 53, wherein receiving a reference signal configuration comprises receiving the reference signal configuration using explicit layer-3 signaling.

58. The method of claim 53, wherein receiving a reference signal configuration comprises receiving the reference signal configuration using explicit Physical Downlink Control Channel (PDCCH) signaling.

59. The method of claim 53, wherein receiving a reference signal configuration comprises receiving the reference signal configuration using implicit Physical Downlink Control Channel (PDCCH) signaling.

60. The method of claim 53, wherein the reference signal configuration distinguishes between Multimedia Broadcast over a Single-Frequency Network (MBSFN) subframes and non-MBSFN subframes.

61. The method of claim 53, wherein processing the additional specific reference signal comprises generating feedback based on the additional specific reference signal.

62. The method of claim 53, wherein the wireless communication device is a User Equipment (UE).

63. The method of claim 53, wherein the specific reference signal is a User Equipment-specific Reference Signal (UE-RS).

64. The method of claim 53, wherein the additional specific reference signal is in addition to a baseline specific reference signal.

65. A computer-program product for enabling communication with a high-mobility wireless communication device, the computer-program product comprising a non-transitory tangible computer-readable medium having instructions thereon, the instructions comprising:
  code for causing a base station to identify a high-mobility wireless communication device;
  code for causing the base station to send a reference signal configuration;
  code for causing the base station to allocate an additional specific reference signal in response to identifying the high-mobility wireless communication device; and
  code for causing the base station to send the additional specific reference signal to the high-mobility wireless communication device.

66. The computer-program product of claim 65, wherein the specific reference signal is a User Equipment-specific Reference Signal (UE-RS).

67. The computer-program product of claim 65, wherein the additional specific reference signal is in addition to a baseline specific reference signal.

68. A computer-program product for utilizing reference signaling, the computer-program product comprising a non-transitory tangible computer-readable medium having instructions thereon, the instructions comprising:
  code for causing a wireless communication device to determine whether the wireless communication device is a high-mobility wireless communication device;
  code for causing the wireless communication device to receive a reference signal configuration;
  code for causing the wireless communication device to receive an additional specific reference signal;
  code for causing the wireless communication device to process the additional specific reference signal; and
  code for causing the wireless communication device to send information based on the additional specific reference signal.

69. The computer-program product of claim 68, wherein the specific reference signal is a User Equipment-specific Reference Signal (UE-RS).

70. The computer-program product of claim 68, wherein the additional specific reference signal is in addition to a baseline specific reference signal.

71. An apparatus for enabling communication with a high-mobility wireless communication device, comprising:
  means for identifying a high-mobility wireless communication device;
  means for sending a reference signal configuration;
  means for allocating an additional specific reference signal in response to identifying the high-mobility wireless communication device; and
  means for sending the additional specific reference signal to the high-mobility wireless communication device.

72. The apparatus of claim 71, wherein the specific reference signal is a User Equipment-specific Reference Signal (UE-RS).

73. The apparatus of claim 71, wherein the additional specific reference signal is in addition to a baseline specific reference signal.

74. An apparatus for utilizing reference signaling, comprising:
  means for determining whether the apparatus is a high-mobility wireless communication device;
  means for receiving a reference signal configuration;
  means for receiving an additional specific reference signal;
  means for processing the additional specific reference signal; and
  means for sending information based on the additional specific reference signal.

75. The apparatus of claim 74, wherein the specific reference signal is a User Equipment-specific Reference Signal (UE-RS).

76. The apparatus of claim 74, wherein the additional specific reference signal is in addition to a baseline specific reference signal.

* * * * *